(12) United States Patent
Kajiya et al.

(10) Patent No.: US 12,032,123 B2
(45) Date of Patent: Jul. 9, 2024

(54) OPTICAL BODY, DISPLAY DEVICE, AND METHOD FOR MANUFACTURING OPTICAL BODY

(71) Applicant: DEXERIALS CORPORATION, Tokyo (JP)

(72) Inventors: Shunichi Kajiya, Miyagi (JP); Hideki Terashima, Miyagi (JP); Yutaka Muramoto, Miyagi (JP); Masanao Kikuchi, Miyagi (JP); Takaaki Otowa, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 17/470,339

(22) Filed: Sep. 9, 2021

(65) Prior Publication Data

US 2022/0003897 A1 Jan. 6, 2022

Related U.S. Application Data

(63) Continuation of application No. 15/508,050, filed as application No. PCT/JP2015/074776 on Aug. 31, 2015, now Pat. No. 11,143,795.

(30) Foreign Application Priority Data

Sep. 1, 2014 (JP) ................. 2014-177382

(51) Int. Cl.
*G02B 1/118* (2015.01)
*B29C 33/42* (2006.01)
(Continued)

(52) U.S. Cl.
CPC ............. *G02B 1/118* (2013.01); *B29C 33/42* (2013.01); *G02B 1/12* (2013.01);
(Continued)

(58) Field of Classification Search
CPC ........ G02B 1/118; G02B 1/12; G02B 5/0273; B29C 33/42; B29C 59/046; B29C 59/023; G02F 1/133502; G02F 2201/38
(Continued)

(56) References Cited

U.S. PATENT DOCUMENTS

2006/0093809 A1 5/2006 Hebrink et al.
2009/0267245 A1* 10/2009 Shimmo .............. G11B 7/1365
264/1.21
(Continued)

FOREIGN PATENT DOCUMENTS

JP 2001-517319 A 10/2001
JP 2007-199522 A 8/2007
(Continued)

OTHER PUBLICATIONS

Dec. 1, 2016, Japanese Office Action for related JP application No. 2014-177382.
(Continued)

*Primary Examiner* — Sharrief I Broome
(74) *Attorney, Agent, or Firm* — Paratus Law Group, PLLC

(57) ABSTRACT

There is provided an optical body with improved antireflection capability, a display device, and a method for manufacturing an optical body, the optical body including: a first concave-convex structure formed on a surface of a base material; and a second concave-convex structure superimposed on the first concave-convex structure. An average concave-convex period of the first concave-convex structure is larger than a wavelength in a visible light region, an average concave-convex period of the second concave-convex structure is less than or equal to the wavelength in the visible light region, and projecting parts of the second
(Continued)

concave-convex structure extend in a direction normal to a flat plane of the base material.

9 Claims, 19 Drawing Sheets

(51) Int. Cl.
    *B29C 59/02*    (2006.01)
    *B29C 59/04*    (2006.01)
    *G02B 1/12*    (2006.01)
    *G02B 5/02*    (2006.01)
    *G02F 1/1335*    (2006.01)

(52) U.S. Cl.
    CPC ...... *B29C 2059/023* (2013.01); *B29C 59/046* (2013.01); *G02B 5/0273* (2013.01); *G02F 1/133502* (2013.01); *G02F 2201/38* (2013.01)

(58) Field of Classification Search
    USPC ................................. 359/641, 599, 615, 558
    See application file for complete search history.

(56) References Cited

U.S. PATENT DOCUMENTS

| | | |
|---|---|---|
| 2010/0177398 A1 | 7/2010 | Watanabe et al. |
| 2011/0133065 A1* | 6/2011 | Nakayama ............. B82Y 15/00 250/252.1 |
| 2013/0284497 A1 | 10/2013 | Kajiya et al. |
| 2014/0071026 A1* | 3/2014 | Hatashita ............. G02B 5/0215 345/32 |
| 2014/0100820 A1* | 4/2014 | Sone ...................... G01N 21/57 702/189 |
| 2015/0168610 A1 | 6/2015 | Fukui et al. |
| 2017/0168198 A1* | 6/2017 | Kajiya ..................... B32B 9/00 |
| 2017/0205546 A1* | 7/2017 | Wada ..................... G02B 5/208 |

FOREIGN PATENT DOCUMENTS

| | | | | |
|---|---|---|---|---|
| JP | 2008-216610 A | 9/2008 | | |
| JP | 2009-109702 A | 5/2009 | | |
| JP | 2009-128543 A | 6/2009 | | |
| JP | 2009-130027 A | 6/2009 | | |
| JP | 2009128543 A | * | 6/2009 | |
| JP | 2009-230045 A | 10/2009 | | |
| JP | 2012-079676 A | 4/2012 | | |
| JP | 2012-133066 A | 7/2012 | | |
| JP | 2013-210504 A | 10/2013 | | |
| JP | 2013-210638 A | 10/2013 | | |
| JP | 2013210638 A | * | 10/2013 | ............. B29C 33/38 |
| TW | I423887 B | 1/2014 | | |
| WO | WO 2010-143503 A1 | 12/2010 | | |
| WO | WO 2011-052652 A1 | 5/2011 | | |
| WO | WO 2012-043607 A1 | 4/2012 | | |

OTHER PUBLICATIONS

Mar. 22, 2016, Japanese Office Action for related JP application No. 2014-177382.
Jul. 12, 2016, Japanese Office Action for related JP application No. 2014-177382.
Jan. 10, 2017, Japanese Office Action for related JP application No. 2016-085999.
Oct. 9, 2018, Taiwanese Office Action issued for related TW application No. 104128612.
May 8, 2019, Taiwanese Office Action issued for related TW application No. 104128612.
Nov. 11, 2020, Taiwanese Office Action issued for related TW application No. 109102567.
Dec. 1, 2015, Japanese Office Action for related JP application No. 2014-177382.

* cited by examiner

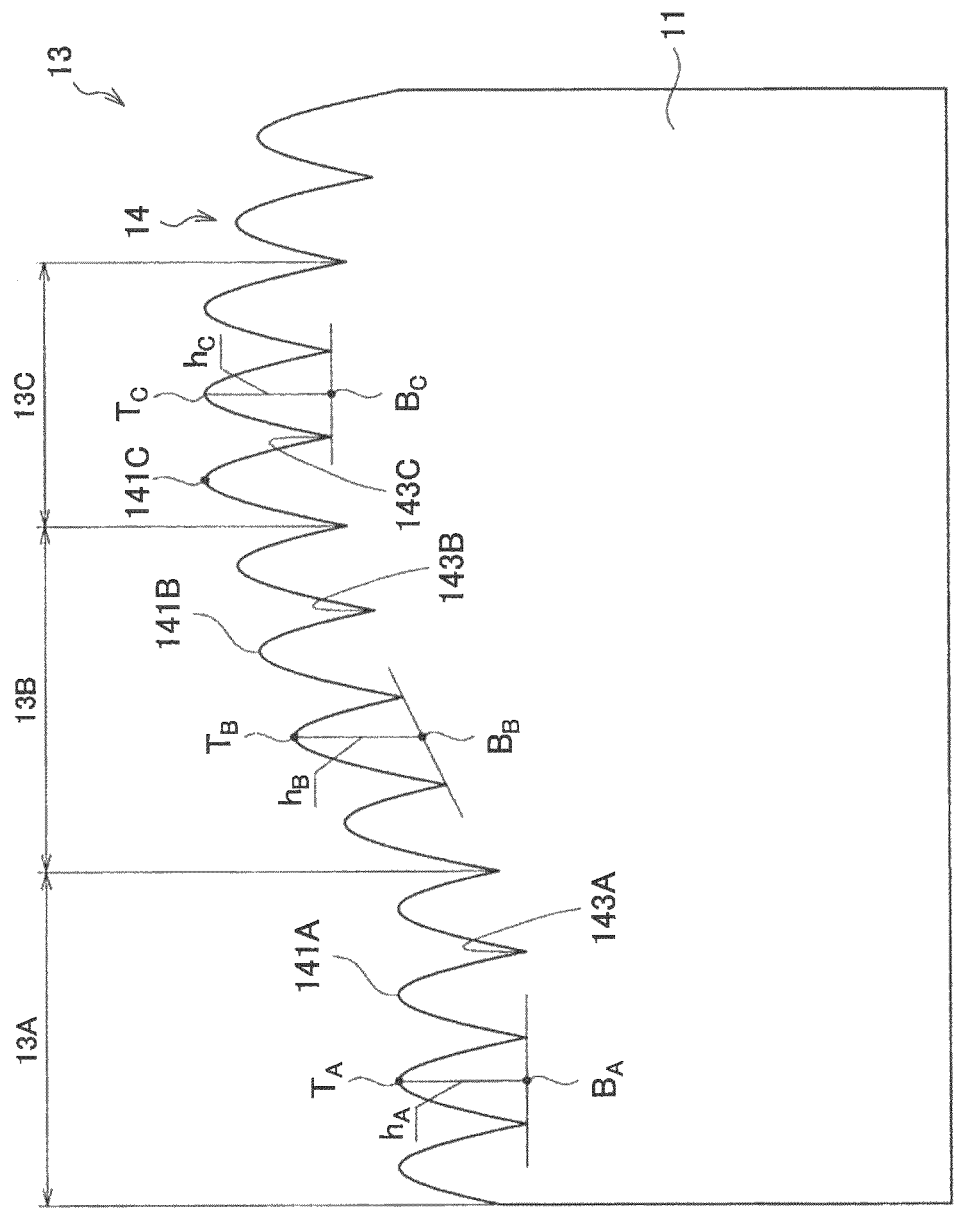

OPTICAL BODY, DISPLAY DEVICE, AND METHOD FOR MANUFACTURING OPTICAL BODY

CROSS-REFERENCE TO PRIOR APPLICATION

This application is a National Stage Patent Application of PCT International Patent Application No. PCT/JP2015/074776 (filed on Aug. 31, 2015) under 35 U.S.C. § 371, which claims priority to Japanese Patent Application No. 2014-177382 (filed on Sep. 1, 2014), which are all hereby incorporated by reference in their entirety.

TECHNICAL FIELD

The present invention relates to an optical body, a display device, and a method for manufacturing an optical body.

BACKGROUND ART

In general, in display devices, such as televisions, and optical elements, such as camera lenses, antireflection processing is performed on a surface where light enters, in order to improve the amount of light transmission.

Conventionally, as one of such antireflection processing, formation of a micro concave-convex structure whose average concave-convex period is less than or equal to a wavelength in the visible light region (e.g., a moth-eye structure) on a light incident surface has been proposed, for example. At the surface having such a micro concave-convex structure, a refractive index changes gradually with respect to incident light, and thus a steep change in refractive index, which causes reflection, does not occur. Accordingly, forming such a micro concave-convex structure on the light incident surface prevents reflection of incident light for a wide wavelength region.

Moreover, it is desired that the micro concave-convex structure described above be formed to be superimposed on the surface of a macro concave-convex structure having larger concavity and convexity than the micro concave-convex structure. Examples of the macro concave-convex structure include an antiglare structure body having a rough surface structure formed on its surface in order to scatter incident light, and a microlens array structure body in which a plurality of lenses are two-dimensionally arranged.

Hence, Patent Literature 1 below discloses a technology of superimposing, by an anodization method, a micro concave-convex structure on an antiglare structure in which concavity and convexity larger than the micro concave-convex structure is formed.

CITATION LIST

Patent Literature

Patent Literature 1: WO 2011/052652

SUMMARY OF INVENTION

Technical Problem

However, the technology disclosed in Patent Literature 1 employs wet etching as a method for forming the micro concave-convex structure; thus, the micro concave-convex structure is formed isotopically on the surface of the antiglare structure body. Consequently, a projecting part of the micro concave-convex structure extends in the direction normal to the tangent plane at each position on the surface of the antiglare structure.

In such a superimposition structure, directions in which projecting parts in the micro concave-convex structure extend are not aligned in a direction normal to a flat plane of a base material, which leads to a problem of a reduction in antireflection capability for strong external light from the front.

Hence, the present invention has been made in view of the above problem. An object of the present invention is to provide a novel and improved optical body with improved antireflection capability, a display device including the optical body, and a method for manufacturing the optical body.

Solution to Problem

According to an aspect of the present invention in order to achieve the above object, there is provided an optical body including: a first concave-convex structure formed on a surface of a base material; and a second concave-convex structure superimposed on the first concave-convex structure. An average concave-convex period of the first concave-convex structure is larger than a wavelength in a visible light region, an average concave-convex period of the second concave-convex structure is less than or equal to the wavelength in the visible light region, and projecting parts of the second concave-convex structure extend in a direction normal to a flat plane of the base material.

The projecting parts of the second concave-convex structure may include a peak-side projecting part in a peak part of the first concave-convex structure, a valley-side projecting part in a valley part of the first concave-convex structure, and an intermediate projecting part in a slope part between the peak part and the valley part of the first concave-convex structure, and a height of the intermediate projecting part may be different from heights of the peak-side projecting part and the valley-side projecting part.

A spectral regular luminous reflectance of the optical body may be 0.3% or less, and a haze value of the optical body may be 5% or more.

A 20-degree glossiness of the optical body may be 4% or less.

The projecting parts of the second concave-convex structure may be arranged periodically.

The projecting parts of the second concave-convex structure may be arranged in a hexagonal lattice form or a rectangular lattice form.

The base material may be a resin film.

According to another aspect of the present invention in order to achieve the above object, there is provided a display device including the above optical body.

According to another aspect of the present invention in order to achieve the above object, there is provided a method for manufacturing an optical body, including: a step of forming a second concave-convex structure whose average concave-convex period is less than or equal to a wavelength in a visible light region on a surface of a base material; a step of forming a resist layer on the surface of the base material on which the second concave-convex structure is formed; a step of forming a first concave-convex structure on a surface of the resist layer; and a step of superimposing the first concave-convex structure and the second concave-convex structure on the surface of the base material by etching with perpendicular anisotropy.

In the etching with perpendicular anisotropy, an etching rate of the resist layer may be different from an etching rate of the base material.

In the etching with perpendicular anisotropy, the etching rate of the resist layer may be lower than the etching rate of the base material, and the second concave-convex structure may be superimposed on the first concave-convex structure, being inverted in the direction normal to the flat plane of the base material.

A ratio of the etching rate of the resist layer to the etching rate of the base material may be 1:1.2 to 1:20.

A gas used in the etching with perpendicular anisotropy may contain a carbon atom, a fluorine atom, and a hydrogen atom.

An etching rate ratio of the resist layer with respect to the base material may be 1.5 or more.

The method for manufacturing an optical body may further include a step of transferring a surface shape of the optical body manufactured by the above method to a resin base material to copy the optical body.

According to another aspect of the present invention in order to achieve the above object, there is provided an optical body manufactured by the above method.

According to the present invention, the projecting parts of the second concave-convex structure can be made to extend in the direction normal to the flat plane of the base material; thus, regular reflection for external light can be suppressed.

Advantageous Effects of Invention

According to the present invention, the projecting parts of the second concave-convex structure extend in the direction normal to the flat plane of the base material; thus, antireflection capability of the optical body can be improved.

BRIEF DESCRIPTION OF DRAWINGS

FIG. 1B is an enlarged cross-sectional view schematically illustrating a partial region X of FIG. 1A in an enlarged view.

DESCRIPTION OF EMBODIMENTS

Figure 1A:
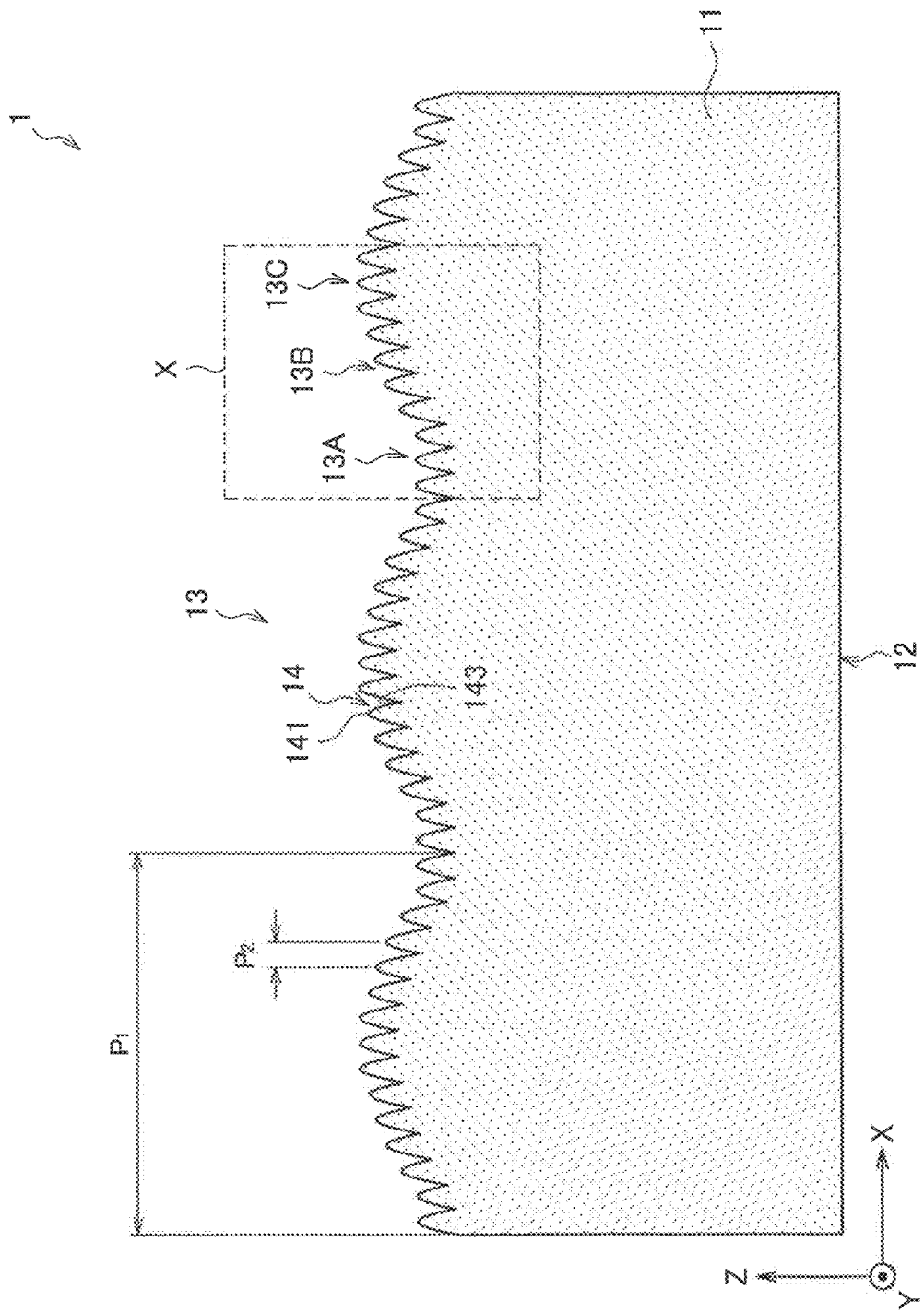
FIG. 1A is a cross-sectional view schematically illustrating a cross-sectional shape of an optical body according to an embodiment of the present invention taken along the thickness direction.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

<1. Optical Body>

(1.1. Structure of Optical Body)

First, a structure of an optical body according to an embodiment of the present invention will be described with reference to FIGS. 1A to 2. FIG. 1A is a cross-sectional view schematically illustrating a cross-sectional shape of an optical body 1 according to the present embodiment taken along the thickness direction. As illustrated in FIG. 1A, the optical body 1 according to the present embodiment includes a macro concave-convex structure 13 (corresponding to a first concave-convex structure) formed on the surface of a base material 11 and a micro concave-convex structure 14 (corresponding to a second concave-convex structure) superimposed on the macro concave-convex structure 13.

The base material 11 is made of a material having transparency. Examples of the material of the base material 11 include a transparent resin, such as polycarbonate, polyethylene terephthalate, or polymethyl methacrylate, a resin film, such as cellulose triacetate (TAC) or cyclic olefin copolymer (COC), and transparent glass, such as quartz glass, soda-lime glass, or lead glass. Note that the material of the base material 11 is not limited to the materials given above, and may be any other known material as long as it is transparent.

In the above description, "transparent" means that the transmittance of light having a wavelength in the visible light region (about 360 nm to 830 nm) is high, and for example, means that the transmittance of the light is 70% or more.

The macro concave-convex structure 13 is a concave-convex structure formed on the base material 11, and includes a valley part 13A that is concave with respect to a flat plane 12 of the base material 11 and a peak part 13C that is convex with respect to the flat plane 12 of the base material 11, as illustrated in FIG. 1A. In addition, a slope part 13B is formed between the valley part 13A and the peak part 13C adjacent to each other. The average concave-convex period of the macro concave-convex structure 13 according to the present embodiment is larger than a wavelength in the visible light region (e.g., more than 830 nm), preferably more than or equal to 1 μm and less than or equal to 100 μm. Here, the average concave-convex period in the macro concave-convex structure 13 corresponds to the average distance $P_1$ between adjacent valley parts 13A and 13A or between adjacent peak parts 13C and 13C, illustrated in FIG. 1A.

This macro concave-convex structure 13 may be, for example, an antiglare structure with an average concave-convex period of more than or equal to 1 μm and less than or equal to 100 μm. Alternatively, the macro concave-convex structure 13 may be a microlens array structure in which a plurality of lenses with a diameter of more than or equal to 1 μm and less than or equal to 100 μm are two-dimensionally arranged on the XY plane in FIG. 1A. Hereinafter, description will be given taking as an example a case where the macro concave-convex structure 13 is an antiglare structure.

The micro concave-convex structure 14 is a concave-convex structure that is formed to be superimposed on the macro concave-convex structure 13, and, as illustrated in FIG. 1A, includes a plurality of projecting parts 141 that extend in the direction normal to the flat plane 12 of the base material 11, and a bottom part 143 that is positioned between the projecting parts 141 and 141 adjacent to each other. The average concave-convex period of the micro concave-convex structure 14 according to the present embodiment is less than or equal to a wavelength in the visible light region (e.g., 830 nm or less), preferably more than or equal to 100 nm and less than or equal to 350 nm. Here, the average concave-convex period in the micro concave-convex structure 14 corresponds to the average distance $P_2$ between the tops of the projecting parts 141 and 141 adjacent to each other, illustrated in FIG. 1A.

The micro concave-convex structure 14 having this structure may be, for example, a moth-eye structure in which the plurality of projecting parts 141 that extend in the direction normal to the flat plane of the base material 11 are two-dimensionally arranged periodically on the XY plane of the base material 11 illustrated in FIG. 1A. Here, the two-dimensional arrangement of the projecting parts 141 of the micro concave-convex structure 14 on the XY plane in FIG. 1A may be an arrangement with predetermined periodicity, or may be a random arrangement without periodicity. Note that the two-dimensional arrangement of the projecting parts 141 on the XY plane is preferably an arrangement with predetermined periodicity, as will be described later with reference to FIG. 2.

Here, in the optical body 1 according to the present embodiment, all of the projecting parts 141 included in the micro concave-convex structure 14 extend in the direction normal to the flat plane 12 of the base material 11 (i.e., the Z direction). Thus, in the optical body 1, directions in which the projecting parts 141 of the micro concave-convex structure 14 extend are aligned in the entire base material 11, which further improves antireflection capability when strong external light enters the optical body 1.

On the other hand, in the case where the projecting part 141 extends in the direction normal to the tangent plane at each position on the surface of the macro concave-convex structure 13 as in a conventional technology (this case is not illustrated), the direction in which the projecting part 141 of the micro concave-convex structure 14 extends varies, depending on whether the projecting part 141 is formed on the surface of the valley part 13A, the slope part 13B, or the peak part 13C of the macro concave-convex structure 13. In such an optical body, directions in which the projecting parts 141 extend are not aligned in the entire base material 11, which reduces antireflection capability when strong external light enters the optical body.

Next, the micro concave-convex structure 14 will be described more specifically with reference to FIGS. 1B and 2. FIG. 1B is an enlarged cross-sectional view schematically illustrating a partial region X of FIG. 1A in an enlarged view. FIG. 2 is a top view illustrating an example of a plane arrangement of the optical body 1 according to the present embodiment.

As illustrated in FIG. 1B, the projecting parts 141 of the micro concave-convex structure 14 include a valley-side projecting part 141A formed in the valley part 13A of the macro concave-convex structure 13, an intermediate projecting part 141B formed in the slope part 13B of the macro concave-convex structure 13, and a peak-side projecting part 141C formed in the peak part 13C of the macro concave-convex structure 13.

In the optical body 1 according to the present embodiment, the height h B of the intermediate projecting part 141B is preferably different from the height $h_A$ of the valley-side projecting part 141A and the height $h_C$ of the peak-side projecting part 141C, as schematically illustrated in FIG. 1B. Moreover, the height $h_B$ of the intermediate projecting part 141B is further preferably smaller than the height $h_A$ of the valley-side projecting part 141A and the height $h_C$ of the peak-side projecting part 141C. A wavelength region of light whose reflection can be prevented in the micro concave-convex structure 14 depends on the heights of the projecting parts 141. Therefore, the projecting parts 141 of the micro concave-convex structure 14 including the valley-side projecting part 141A and the peak-side projecting part 141C, and the intermediate projecting part 141B having a smaller height than these projecting parts widen a wavelength region of incident light whose reflection can be prevented. For example, in the case where the height $h_A$ of the valley-side projecting part 141A and the height $h_C$ of the peak-side projecting part 141C are more than or equal to 300 nm and less than or equal to 400 nm, the height $h_B$ of the intermediate projecting part 141B is preferably more than or equal to 200 nm and less than or equal to 300 nm.

Here, as illustrated in FIG. 1B, a base line that virtually connects two bottom parts 143A positioned at both sides of a top $T_A$ is assumed, and an intersection point of this base line and a straight line drawn from the top $T_A$ along the direction normal to the flat plane 12 of the base material 11 (Z direction) is denoted by $B_A$. The height of the valley-side projecting part 141A corresponds to the distance between the top $T_A$ and the intersection point $B_A$. Similarly, the height of the intermediate projecting part 141B corresponds to the distance between a top $T_B$ and an intersection point $B_B$ illustrated in FIG. 1B, and the height of the peak-side projecting part 141C corresponds to the distance between a top $T_C$ and an intersection point $B_C$ illustrated in FIG. 1B.

Figure 2:
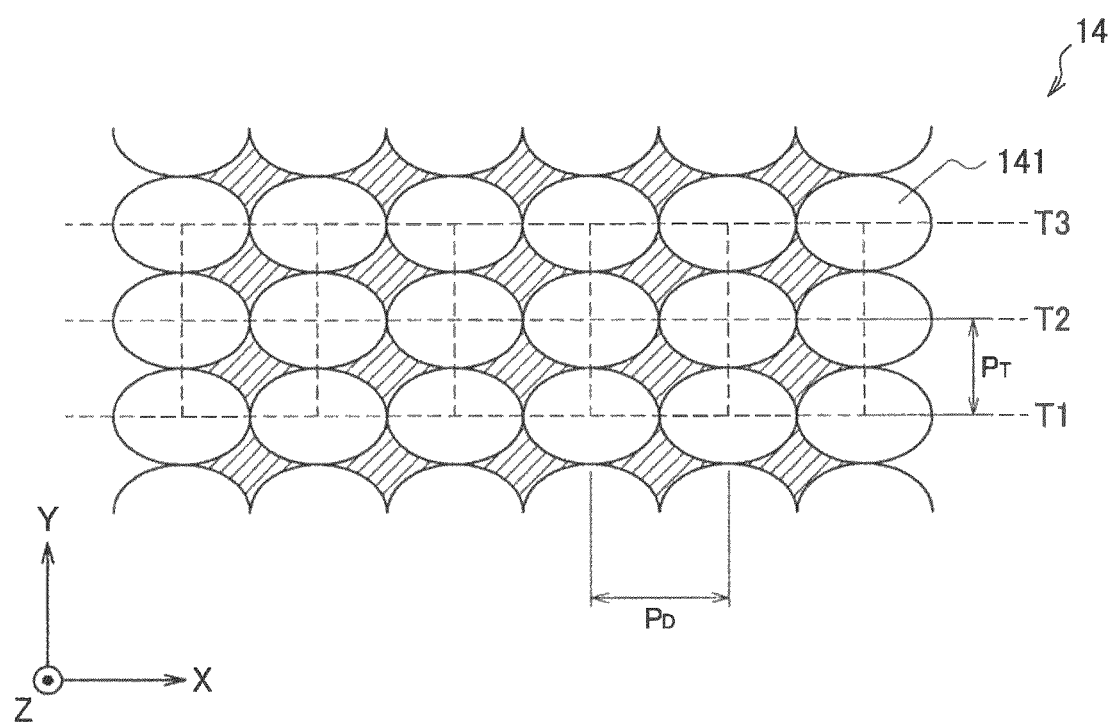
FIG. 2 is a plan view illustrating an example of a plane arrangement of the optical body according to the embodiment.

As illustrated in FIG. 2, the projecting parts 141 of the micro concave-convex structure 14 are arranged along a plurality of rows of tracks (e.g., tracks T1, T2, and T3) having a predetermined interval $P_T$ in the Y direction in FIG. 2. In each track T, the projecting parts 141 are arranged in a constant period along the X direction in FIG. 2.

Here, the projecting parts 141 are arranged in a manner that, for example, the interval between the tops of the projecting parts 141 adjacent to each other is less than or equal to a wavelength in the visible light region. Specifically, the projecting parts 141 are arranged in a manner that each of the arrangement interval (dot pitch) $P_D$ between the projecting parts 141 in each track and the arrangement interval (track pitch) $P_T$ between the tracks of the projecting parts 141 is less than or equal to a wavelength in the visible light region, as illustrated in FIG. 2.

For example, the dot pitch $P_D$ and the track pitch $P_T$ are each more than or equal to 100 nm and less than or equal to 350 nm, preferably more than or equal to 150 nm and less than or equal to 280 nm. Here, it is not preferable that one of the dot pitch $P_D$ and the track pitch $P_T$ be less than 100 nm, because the micro concave-convex structure 14 becomes difficult to form. In addition, it is not preferable that one of the dot pitch $P_D$ and the track pitch $P_T$ exceed 350 nm, because diffraction of visible light may occur. Note that the dot pitch $P_D$ and the track pitch $P_T$ may be the same as or different from each other in size.

The plurality of rows of tracks in which the projecting parts 141 are arranged may be straight-lined as illustrated in FIG. 2, but the present invention is not limited to this example. For example, the plurality of rows of tracks in which the projecting parts 141 are arranged may be curved.

Furthermore, FIG. 2 illustrates an example in which the projecting parts 141 are arranged in a rectangular lattice form on the XY plane of the base material 11, but the present invention is not limited to this example. For example, the projecting parts 141 may have a staggered arrangement in which the arrangement pitch (the dot pitch $P_D$) between the projecting parts 141 is shifted by half the dot pitch between adjacent tracks, and be arranged in hexagonal shapes on the XY plane of the base material 11. To increase the filling factor of the projecting parts 141 on the XY plane, the projecting parts 141 are preferably arranged in hexagonal shapes.

(1.2. Characteristics of Optical Body)

Next, optical characteristics of the optical body 1 according to the present embodiment having the above-described structure will be described.

In the optical body 1 according to the present embodiment, the micro concave-convex structure 14 whose average concave-convex period is less than or equal to a wavelength in the visible light region is superimposed on the macro concave-convex structure 13 whose average concave-convex period is larger than a wavelength in the visible light region, as described above. Thus, the optical body 1 according to the present embodiment can have both high antireflection capability and high antiglare capability.

Specifically, the optical body 1 according to the present embodiment has a spectral regular luminous reflectance of 0.3% or less and a haze value of 5% or more. Preferably, the optical body 1 according to the present embodiment has a spectral regular luminous reflectance of 0.3% or less and a haze value of 10% or more. Spectral regular luminous reflectance is a Y value when the color of regular reflected light for incident light is expressed in Yxy color space, and indicates the lightness of color of regular reflected light. That is, lower spectral regular luminous reflectance indicates higher antireflection capability. A haze value is the proportion of diffuse transmittance in the total light transmittance of light that enters an optical body, and a higher haze value indicates that the optical body has a higher light scattering property and has higher antiglare capability. The optical body 1 according to the present embodiment has low spectral regular reflectance, thus having antireflection capability, and has a high haze value, thus having high antiglare capability.

The value of the spectral regular luminous reflectance is preferably as small as possible, and may be any value larger than 0%, for example, though a lower limit value is not particularly provided. The value of the haze value may be any value less than 100%, for example, though an upper limit value is not particularly provided because different values are required for different uses.

Moreover, the optical body 1 according to the present embodiment can suppress regular reflection for external light, because directions in which the projecting parts 141 extend are aligned in the direction normal to the flat plane 12 of the base material 11, as described above.

Specifically, the glossiness at 20° (incident angle) of the optical body 1 according to the present embodiment is 4% or less, preferably less than 1%. Glossiness is a value indicating the degree of regular reflected light with respect to incident light, and lower glossiness indicates more suppression of regular reflection. The optical body 1 according to the present embodiment suppresses regular reflection even when receiving strong external light, and thus can prevent glare, etc.

The value of the glossiness may be any value larger than 0%, for example, though a lower limit value is not particularly provided.

The structure and characteristics of the optical body 1 according to the present embodiment have been described above in detail. The present embodiment provides an optical body whose light transmittance is improved by an increase in antireflection capability.

<2. Method for Manufacturing Optical Body>
(2.1. First Manufacturing Method)

Figure 3A:
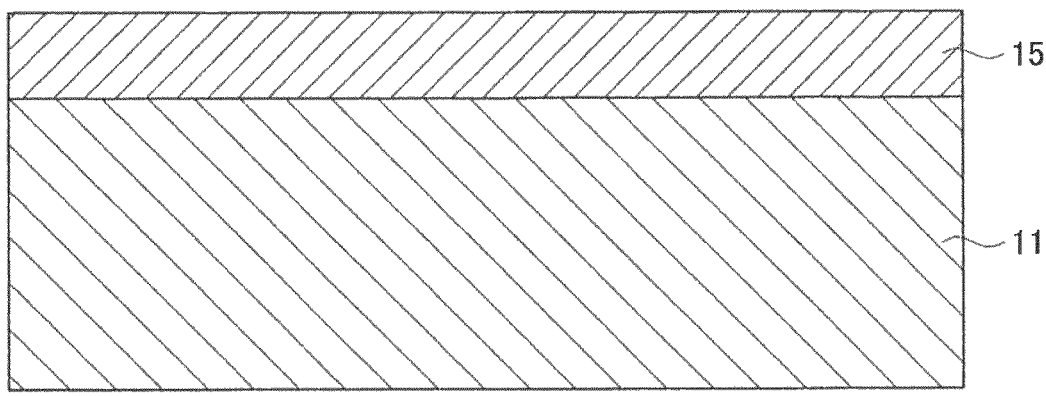
FIG. 3A is a cross-sectional view for describing a step of a first manufacturing method of the optical body according to the embodiment.

Now, a first manufacturing method of the optical body 1 according to the present embodiment will be described with reference to FIGS. 3A to 4. FIGS. 3A to 3H are cross-sectional views for describing the steps of the first manufacturing method of the optical body 1 according to the present embodiment.

Specifically, in the first manufacturing method of the optical body 1 according to the present embodiment, first, the micro concave-convex structure 14 is formed on the base material 11, and then the macro concave-convex structure 13 is formed to be superimposed on the micro concave-convex structure 14.

In the first manufacturing method, first, as illustrated in FIG. 3A, a first resist layer 15 is formed as a film on the base material 11 of quartz glass or the like, for example. Here, either of an organic-based resist and an inorganic-based resist may be used for the first resist layer 15. As the organic-based resist, for example, a novolac-based resist, a chemically amplified resist, or the like may be used. As the inorganic-based resist, for example, a metal oxide containing one or two or more transition metals such as tungsten or molybdenum may be used.

Figure 3B:
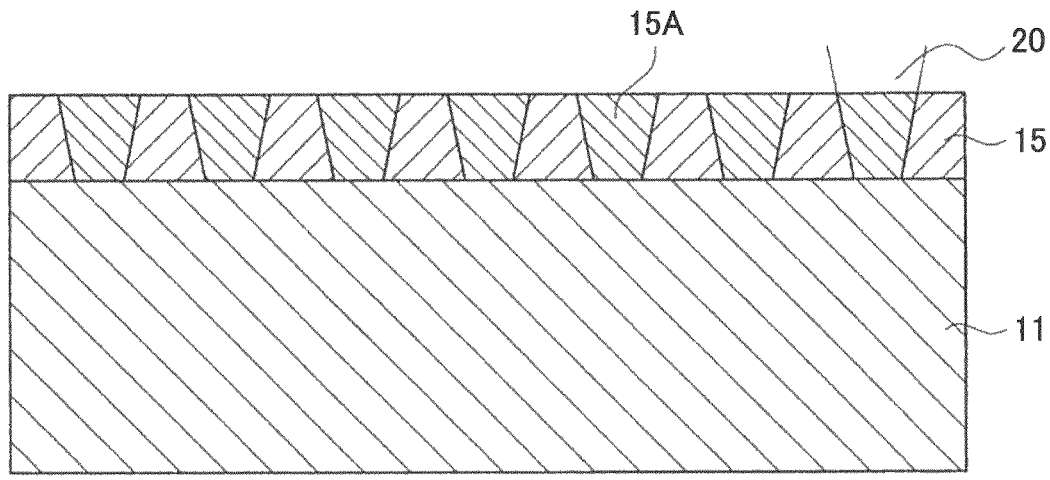
FIG. 3B is a cross-sectional view for describing a step of the first manufacturing method of the optical body according to the embodiment.
Figure 4:
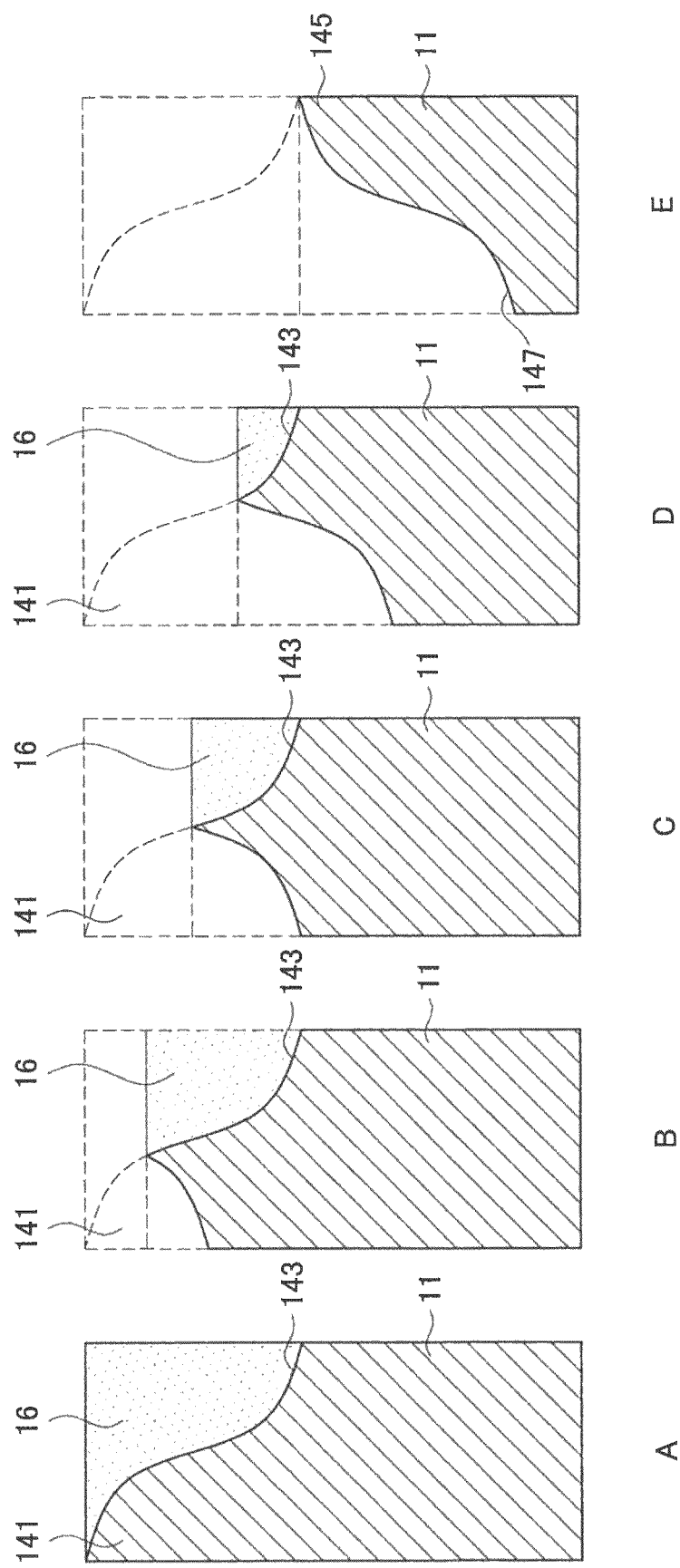
FIG. 4 is an explanatory diagram for describing the etching of a micro concave-convex structure in the etching step illustrated in FIG. 3G.

Next, as illustrated in FIG. 3B, the first resist layer 15 is exposed to light by an exposure device, and a latent image 15A is formed on the first resist layer 15. Specifically, the first resist layer 15 is irradiated with a high-energy electromagnetic wave 20, such as laser light, an ultraviolet ray, an X-ray, or an electron beam, and thus the part irradiated with the electromagnetic wave 20 of the first resist layer 15 is modified, and the latent image 15A is formed.

Figure 3C:
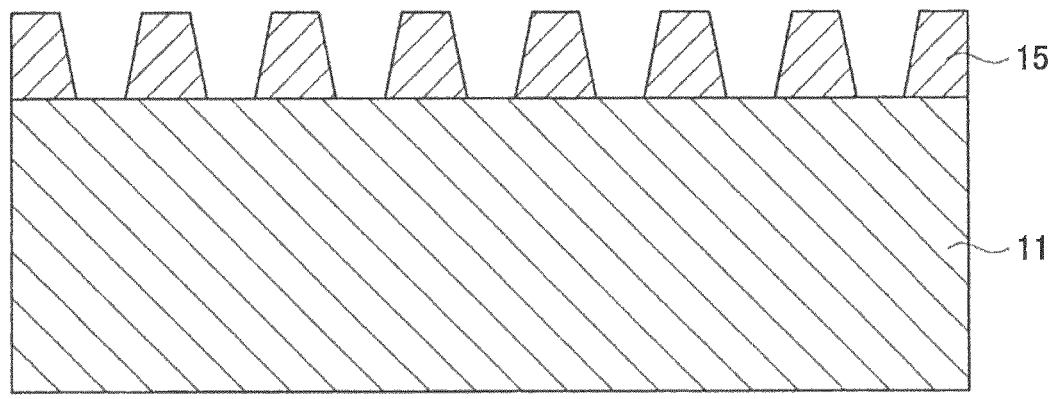
FIG. 3C is a cross-sectional view for describing a step of the first manufacturing method of the optical body according to the embodiment.

Subsequently, as illustrated in FIG. 3C, a developer is dropped onto the first resist layer 15 on which the latent image 15A is formed, and the first resist layer 15 is developed. Thereby, a predetermined pattern is formed on the first resist layer 15. For example, in the case where the first resist layer 15 is a positive resist, the light-exposed portion exposed to the electromagnetic wave 20 is larger in the rate of dissolution in the developer than the light-unexposed portion. Therefore, the light-exposed portion (the latent image 15A) is removed by the development processing as illustrated in FIG. 3C, and a pattern in which the latent image 15A is removed is formed on the first resist layer 15. On the other hand, in the case where the first resist layer 15 is a negative resist, the light-exposed portion exposed to the electromagnetic wave 20 is smaller in the rate of dissolution in the developer than the light-unexposed portion. Therefore, the light-unexposed portion is removed by the development processing, and a pattern in which the latent image 15A remains is formed on the first resist layer 15.

Figure 3D:
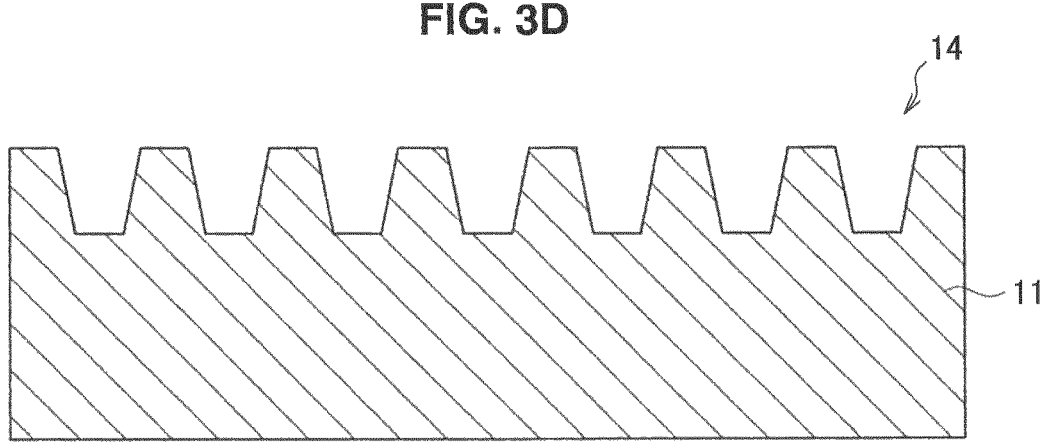
FIG. 3D is a cross-sectional view for describing a step of the first manufacturing method of the optical body according to the embodiment.

Next, as illustrated in FIG. 3D, the first resist layer 15 on which a pattern is formed in the previous step is used as a mask to etch the base material 11. Thereby, the micro concave-convex structure 14 (the second concave-convex structure) is formed on the base material 11. Either of dry etching and wet etching may be used as a method for the etching for the base material 11. Note that it is preferable to use dry etching, which easily provides perpendicular anisotropy, in order to form the micro concave-convex structure 14 whose average concave-convex period is less than or equal to a wavelength in the visible light region with a high aspect ratio.

Etching conditions for the base material 11 can be set appropriately in consideration of the materials of the base material 11 and the first resist layer 15. For example, in the case where quartz glass is used as the base material 11, dry etching using a gas containing a CF-based gas and H or wet etching using hydrofluoric acid or the like may be used to form the micro concave-convex structure 14.

Figure 3E:
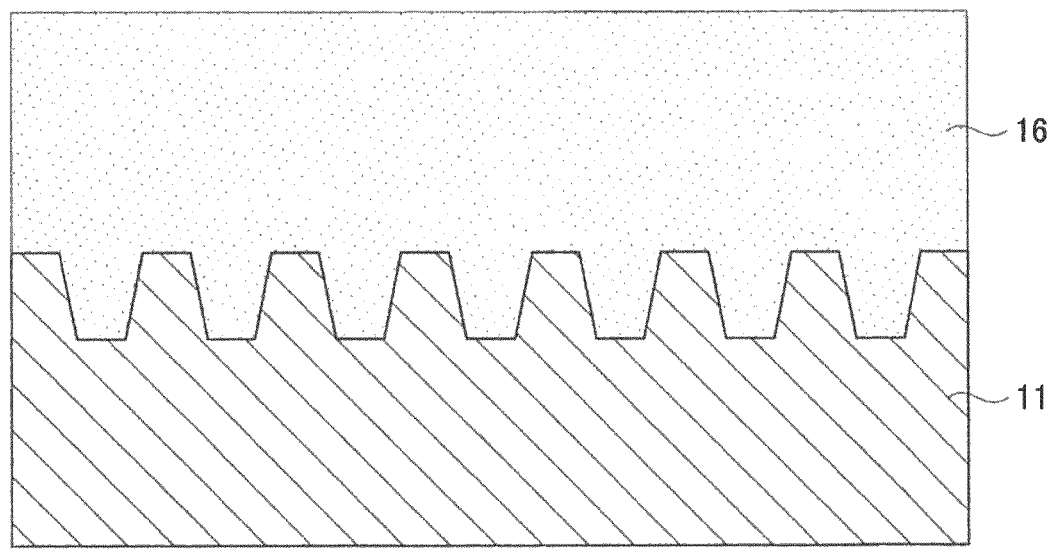
FIG. 3E is a cross-sectional view for describing a step of the first manufacturing method of the optical body according to the embodiment.

Subsequently, as illustrated in FIG. 3E, a second resist layer 16 is formed as a film on the base material 11 on which the micro concave-convex structure 14 is formed. The second resist layer 16 is formed by, for example, dropping an organic resist, such as a photocurable resist or a thermoplastic resist, on the base material 11. Alternatively, an inorganic resist, such as a metal oxide or spin on glass (SOG), can be used as the second resist layer 16.

Note that the material of the second resist layer 16 is selected in a manner that an etching rate of the second resist layer 16 differs from an etching rate of the base material 11 in a step of etching the base material 11, which will be described later. For example, in the case where the base material 11 is an inorganic material, such as quartz glass, the second resist layer 16 is preferably an organic resist. In the case where the base material 11 is an organic material, such as a transparent resin, the second resist layer 16 is preferably an inorganic resist, such as spin on glass.

Figure 3F:
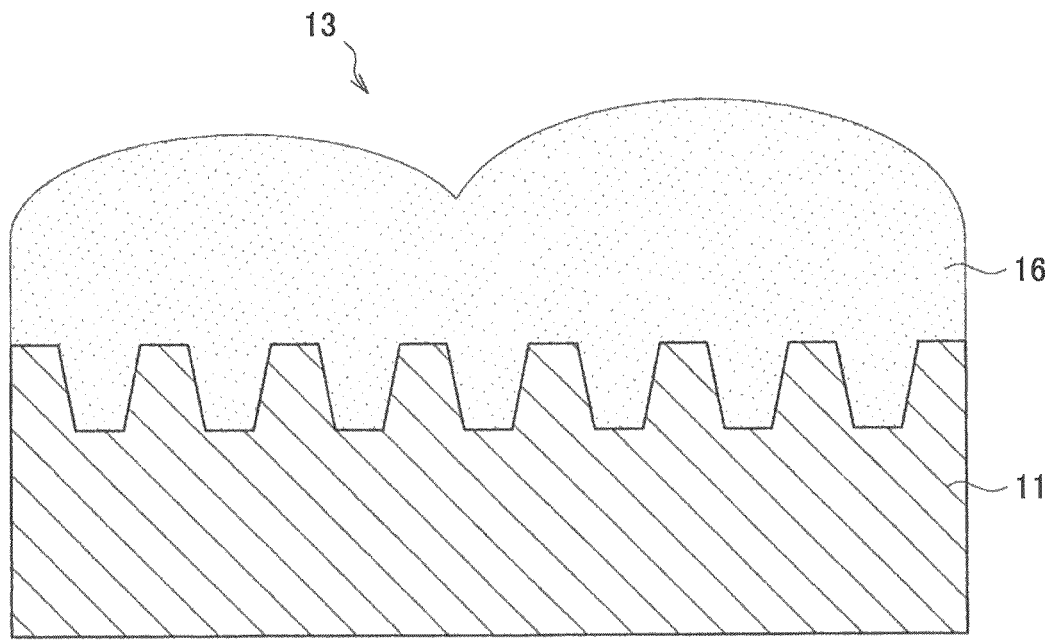
FIG. 3F is a cross-sectional view for describing a step of the first manufacturing method of the optical body according to the embodiment.

Next, as illustrated in FIG. 3F, the macro concave-convex structure 13 (the first concave-convex structure) is formed on the second resist layer 16. Here, the macro concave-convex structure 13 formed on the second resist layer 16 is a concave-convex structure whose average concave-convex period is larger than a wavelength in the visible light region, as described above. For example, the macro concave-convex structure 13 may be formed by imprinting, on the second resist layer 16, a transfer film on which a structure in which the concavity and convexity of the macro concave-convex structure 13 are inverted is formed. Alternatively, the macro concave-convex structure 13 may be formed by performing machining, such as sandblasting, on the second resist layer 16.

Figure 3G:
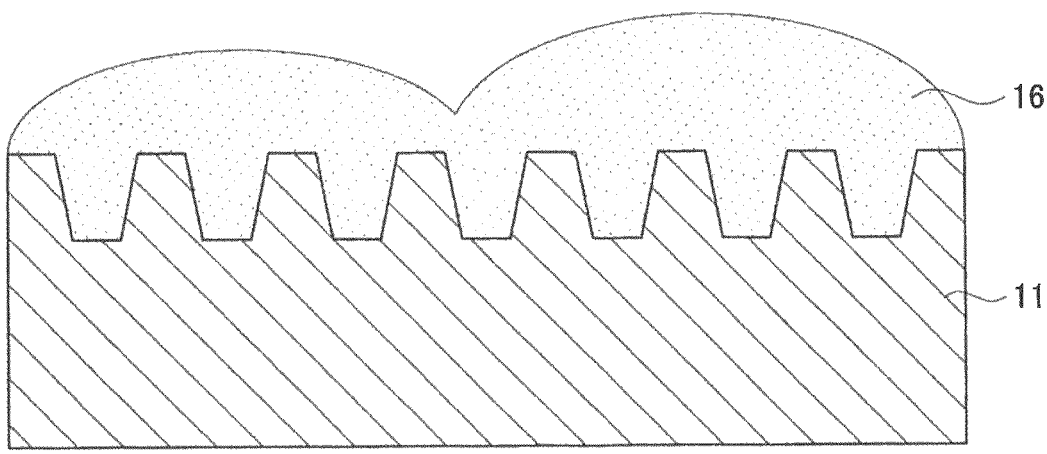
FIG. 3G is a cross-sectional view for describing a step of the first manufacturing method of the optical body according to the embodiment.

Subsequently, as illustrated in FIG. 3G, the second resist layer 16 on which a pattern is formed in the previous step is used as a mask to etch the base material 11. Thus, both the macro concave-convex structure 13 and the micro concave-convex structure 14 are formed to be superimposed on the base material 11.

Here, in this etching step, etching with perpendicular anisotropy is used as the etching for the base material 11. Specifically, reactive ion etching (RIE) is preferably used as the etching of the base material 11 using the second resist layer 16 as a mask. By using such etching with perpendicular anisotropy, in this etching step, the macro concave-convex structure 13 can be formed on the base material 11 without loss of the micro concave-convex structure 14.

On the other hand, in etching with isotropy, such as wet etching, etching on a side surface of the projecting part 141 of the micro concave-convex structure 14 and etching in the perpendicular direction progress similarly. Consequently, the micro concave-convex structure 14 is lost during the etching, which makes it difficult to superimpose the macro concave-convex structure 13 and the micro concave-convex structure 14 on the base material 11. Accordingly, it is not preferable to use etching with isotropy, such as wet etching.

In the etching for the base material 11, the etching rate of the second resist layer 16 and the etching rate of the base material 11 are preferably different from each other.

(1) First Etching Condition

In a first etching condition, the etching rate of the second resist layer 16 is lower than the etching rate of the base material 11. In detail, the ratio of the etching rate of the second resist layer 16 to the etching rate of the base material 11 is preferably 1:1.2 to 1:20.

For example, it is not preferable that the etching rate ratio of the base material 11 with respect to the second resist layer 16 be less than 1.2, because the micro concave-convex structure 14 formed on the base material 11 becomes lost after the etching. In addition, it is not preferable that the etching rate ratio of the base material 11 with respect to the second resist layer 16 exceed 20, because the concavity and convexity depth of the macro concave-convex structure 13 becomes excessively large after the etching, which reduces optical characteristics of the optical body 1.

In this first etching condition, in the case where the base material 11 is quartz glass, a gas used in etching preferably contains a carbon atom, a fluorine atom, and a hydrogen atom. The gas used in etching containing a carbon atom and a fluorine atom enables quartz ($SiO_2$) to be etched. In addition, when the gas used in etching contains a hydrogen atom, a hydrocarbon film is generated on a sidewall of an etching pattern during the etching to protect the sidewall of the pattern, which increases the perpendicular anisotropy of the etching. In the first etching condition, etching with higher perpendicular anisotropy is required; thus, a gas containing a carbon atom, a fluorine atom, and a hydrogen atom is preferably used to increase the perpendicular anisotropy of the etching. On the other hand, it is not preferable that the gas used in etching contain no hydrogen atom, because the perpendicular anisotropy of the etching becomes insufficient.

Specifically, in the case where the base material 11 is quartz glass, $CHF_3$, $CH_2F_2$ gas, or the like can be used. It is also possible to use a gas in which $H_2$ is mixed into a gas such as $CF_4$, $C_2F_8$, or $C_3F_8$. Furthermore, an inert gas, such as Ar gas, can be added to the gas used in etching. Note that a chemically active gas, such as $O_2$ gas, is not preferable because it increases the isotropy of the etching and reduces perpendicular anisotropy.

The etching for the micro concave-convex structure 14 in the first etching condition will be further described.

In the first etching condition, the micro concave-convex structure 14 is protected from etching by the second resist layer 16. Here, the projecting part 141 of the micro concave-convex structure 14 is exposed earlier because the second resist layer 16 is removed faster on the projecting part 141 than on the bottom part 143. Since the etching rate for the base material 11 is higher than the etching rate for the second resist layer 16, the projecting part 141 exposed earlier undergoes etching faster to be etched more deeply than the bottom part 143 at the time the etching is completed. Accordingly, at the time the etching is completed, a new bottom part is formed at a position where the projecting part 141 was formed before this etching step, and a new projecting part is formed at a position where the bottom part 143 was formed. That is, by this etching step, the micro concave-convex structure 14 is superimposed on the macro concave-convex structure 13 in a state where the positions of the projecting part 141 and the bottom part 143 are inverted.

Furthermore, the inversion of the concavity and convexity of the micro concave-convex structure 14 will be described more specifically with reference to FIG. 4. FIG. 4 is an explanatory diagram for describing the etching of the micro concave-convex structure 14 in the etching step illustrated in FIG. 3G.

As illustrated in FIG. 4A, before this etching step, the projecting part 141 and the bottom part 143 of the micro concave-convex structure 14 are formed on the base material 11, and a valley corresponding to the bottom part 143 is filled with the second resist layer 16. In the case where this etching step is performed on this micro concave-convex structure 14, as illustrated in FIG. 4B, the base material 11 is exposed earlier in a portion of the projecting part 141, on which the second resist layer 16 is thin, and the etching of the base material 11 progresses. Here, the projecting part 141 formed on the base material 11 is higher in etching rate than the second resist layer 16, thus being etched by a larger amount than the second resist layer 16 filling the bottom part 143. In the case where the etching of the base material 11 further progresses, as illustrated in FIGS. 4C and 4D, the projecting part 141 exposed earlier is etched more deeply than the bottom part 143, on which the second resist layer 16 is thick.

Therefore, as illustrated in FIG. 4E, in the case where etching is performed until the second resist layer 16 is lost, the projecting part 141 before the etching step is etched more deeply than the bottom part 143 before the etching step to become a new bottom part 147. In addition, the bottom part 143 before the etching step is etched by a smaller amount than the projecting part 141 before the etching step to become a new projecting part 145.

As described above, in the case where the etching rate of the second resist layer 16 is lower than the etching rate of the base material 11, the micro concave-convex structure 14 formed on the base material 11 is superimposed on the macro concave-convex structure 13 in a state where the positions of the projecting part 141 and the bottom part 143 are inverted.

(2) Second Etching Condition

In contrast to the first etching condition, the etching rate of the second resist layer 16 may be higher than the etching rate of the base material 11. In detail, the etching rate ratio of the second resist layer 16 with respect to the base material 11 may be 1.5 or more.

For example, it is not preferable that the etching rate ratio of the second resist layer 16 with respect to the base material 11 be less than 1.5, because the concavity and convexity depth of the micro concave-convex structure 14 formed on the base material 11 becomes small after the etching, which reduces optical characteristics of the optical body 1. The etching rate ratio of the second resist layer 16 with respect to the base material 11 may be less than or equal to 20, for example, though an upper limit value is not particularly provided.

In this second etching condition, in the case where the base material 11 is quartz glass, a gas used preferably contains a carbon atom and a fluorine atom. Using a gas containing a carbon atom and a fluorine atom in etching enables quartz ($SiO_2$) to be etched.

Specifically, in the case where the base material 11 is quartz glass, $CHF_3$, $CH_2F_2$, $CF_4$, $C_2F_8$, $C_3F_8$ gas, or the like can be used as the gas used in etching. Moreover, $H_2$ gas, Ar gas, or the like can be added to any of these gases. Note that a chemically active gas, such as $O_2$ gas, is not preferable because it increases the isotropy of the etching and reduces perpendicular anisotropy.

The etching for the micro concave-convex structure 14 in the second etching condition will be further described.

In the second etching condition, the micro concave-convex structure 14 is protected from etching by the second resist layer 16. Here, since the etching rate for the base material 11 is lower than the etching rate for the second resist layer 16, the macro concave-convex structure 13 formed on the base material 11 has smaller concavity and convexity than the macro concave-convex structure 13 formed on the second resist layer 16. On the other hand, since the amount of concavity and convexity of the macro concave-convex structure 13 formed on the base material 11 is small, the micro concave-convex structure 14 that was formed on the base material 11 before this etching step remains without being lost. Accordingly, the micro concave-convex structure 14 can be superimposed on the macro concave-convex structure 13 also by this etching step.

However, in this etching condition, the height of the projecting part 141 of the micro concave-convex structure 14 becomes smaller than that before the etching, which may reduce antireflection capability. Therefore, the first etching condition, in which the etching rate of the second resist layer 16 is lower than the etching rate of the base material 11, is preferable to the second etching condition.

Figure 3H:
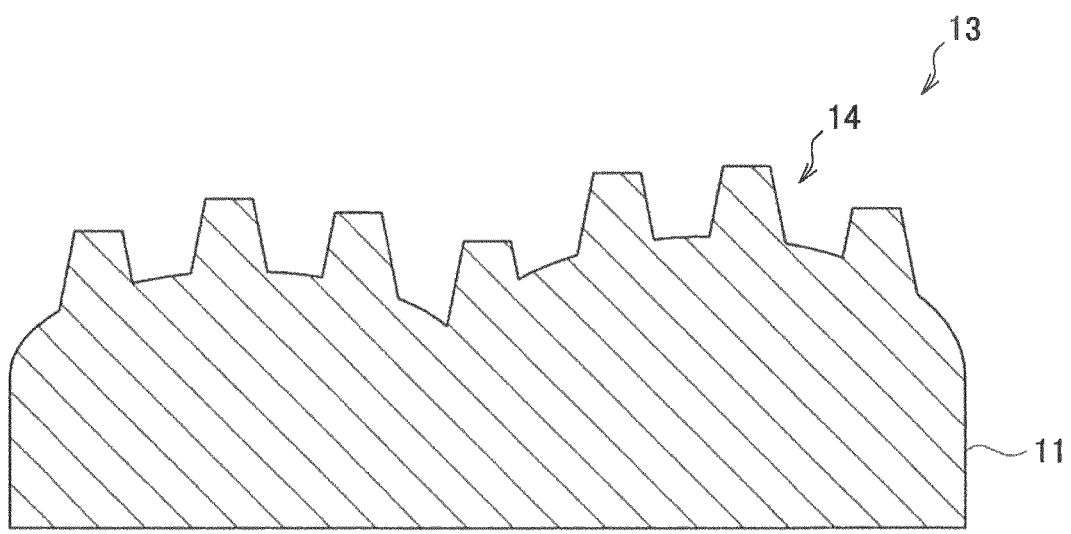
FIG. 3H is a cross-sectional view for describing a step of the first manufacturing method of the optical body according to the embodiment.

Next, as illustrated in FIG. 3H, the remaining second resist layer 16 is removed from the base material 11 on which both the macro concave-convex structure 13 and the micro concave-convex structure 14 are superimposed. The base material 11 from which the second resist layer 16 is removed undergoes cleaning. Thus, the optical body 1 according to the present embodiment is manufactured.

The optical body 1 according to the present embodiment can be manufactured by the first manufacturing method described above. The optical body 1 manufactured by the first manufacturing method has undergone etching with perpendicular anisotropy in the etching step illustrated in FIG. 3G; thus, the projecting parts 141 of the micro concave-convex structure 14 extend in the direction normal to the flat plane 12 of the base material 11. Accordingly, the optical body 1 can suppress regular reflection for strong external light, as described above.

Moreover, since etching with perpendicular anisotropy has been performed in the etching step illustrated in FIG. 3G in the first manufacturing method, the intermediate projecting part 141B of the micro concave-convex structure 14 has a smaller height than the valley-side projecting part 141A and the peak-side projecting part 141C. Accordingly, the optical body 1 manufactured by the first manufacturing method can prevent reflection of incident light in a wider wavelength region, as described above.

In etching with perpendicular anisotropy, ions enter the flat plane 12 of the base material 11 perpendicularly; thus, the valley part 13A and the peak part 13C, whose surfaces are exposed with respect to the ion incident direction, are susceptible to ion energy contributing to etching. In the slope part 13B, which has an angle with respect to the ion incident direction, ion energy contributing to etching is distributed. This makes the etching rate of the slope part 13B lower than the etching rates of the valley part 13A and the peak part 13C. Accordingly, the intermediate projecting part 141B has a smaller height than the valley-side projecting part 141A and the peak-side projecting part 141C.

Furthermore, in the first manufacturing method, the micro concave-convex structure 14 is patterned by lithography using an exposure device; thus, the projecting parts 141 of the micro concave-convex structure 14 can be formed periodically on the surface of the base material 11 in a range such that visible diffracted light does not occur. Accordingly, the optical body 1 according to the present embodiment can suppress transmission loss of incident light due to diffraction scattering.

(2.2. Second Manufacturing Method)

Figure 5:
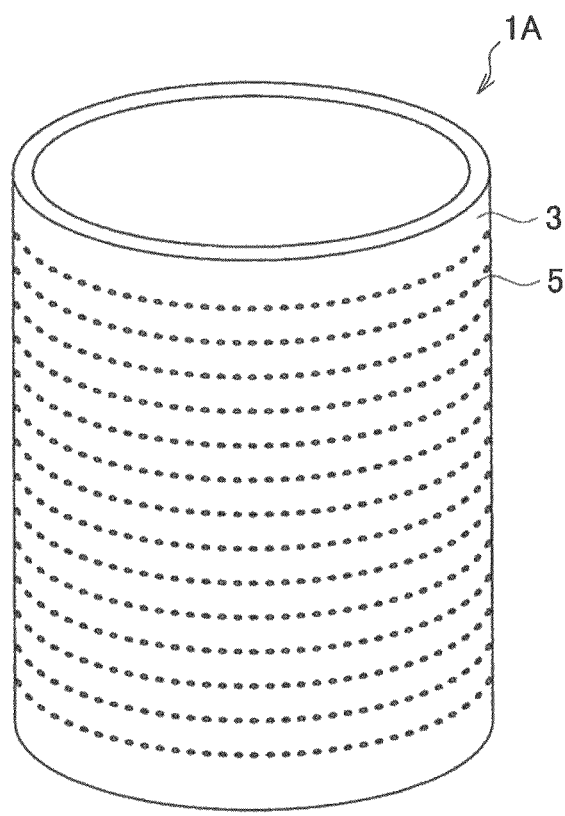
FIG. 5 is a perspective view for describing an optical body master for manufacturing the optical body according to the embodiment.
Figure 6:
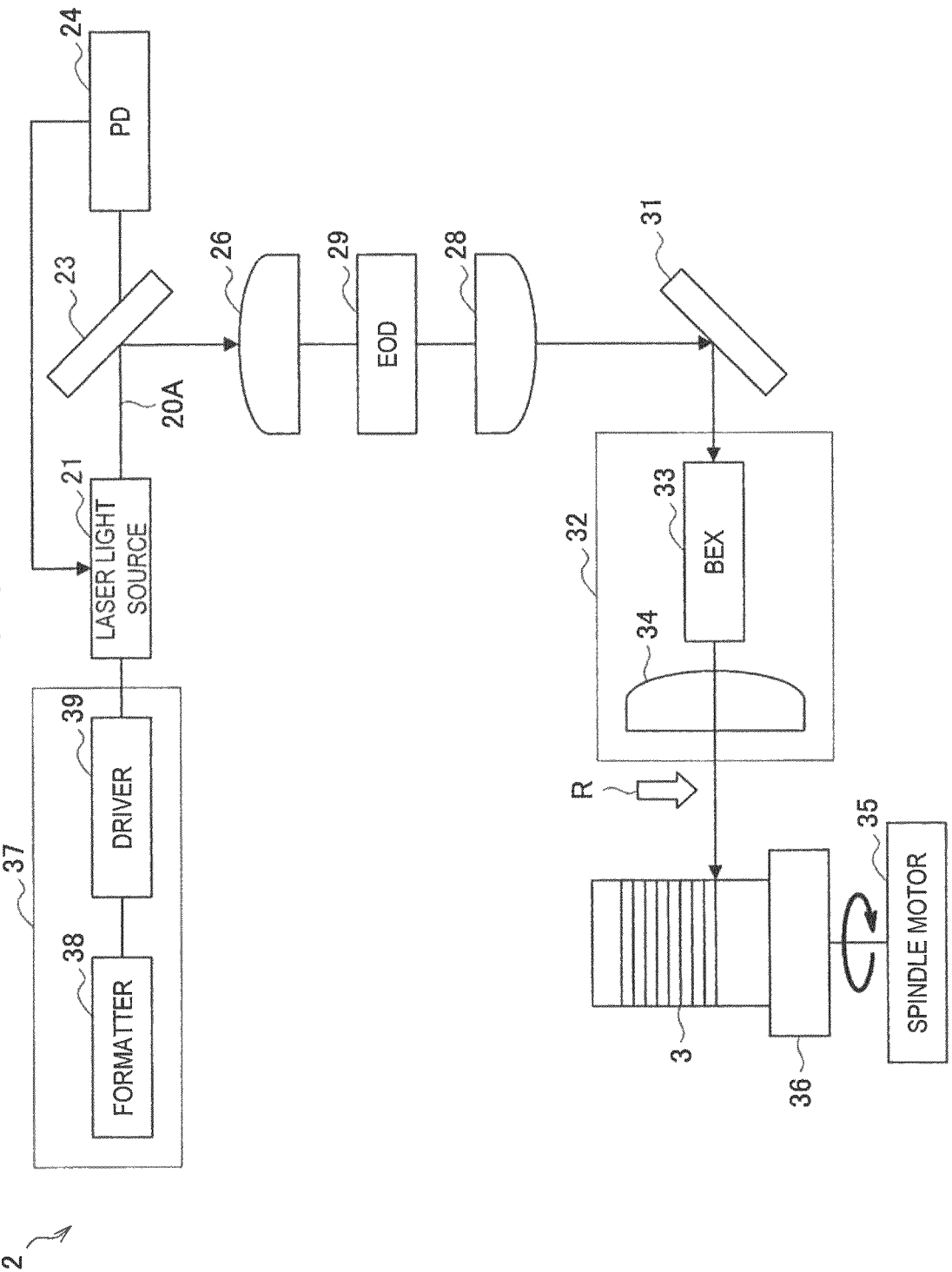
FIG. 6 is an explanatory diagram illustrating an example of an exposure device for manufacturing the optical body master illustrated in FIG. 5.
Figure 7:
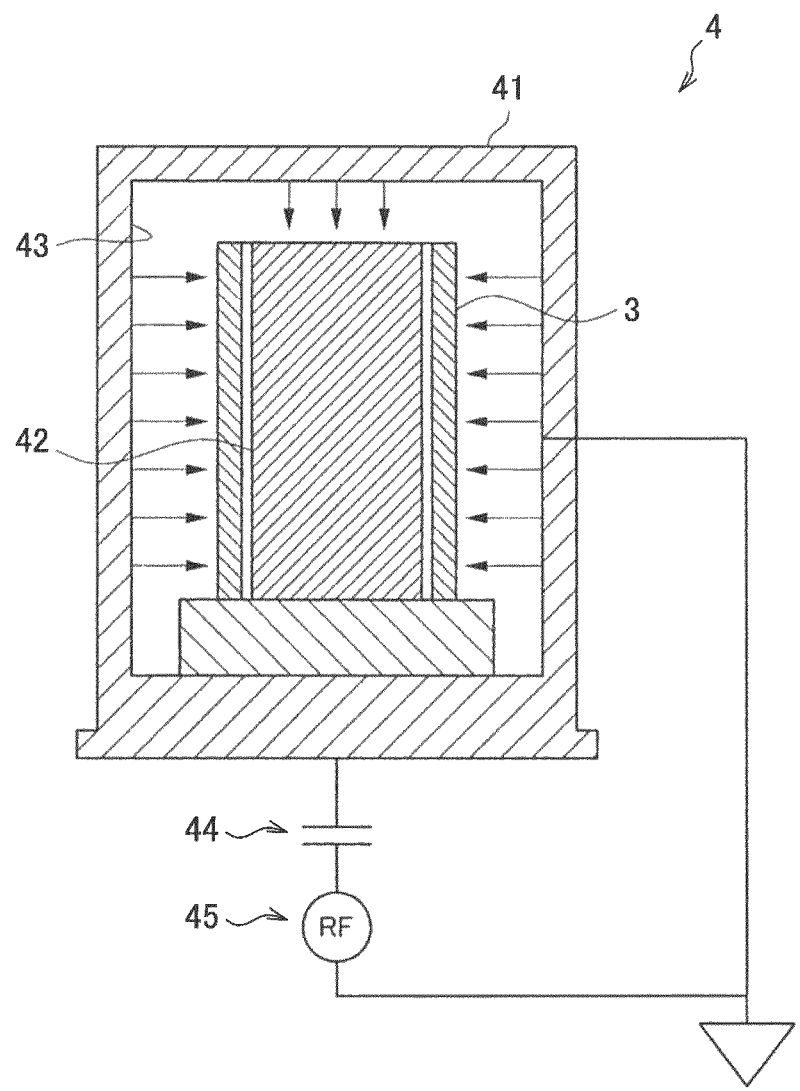
FIG. 7 is an explanatory diagram illustrating an example of an etching device for manufacturing the optical body master illustrated in FIG. 5.
Figure 8:
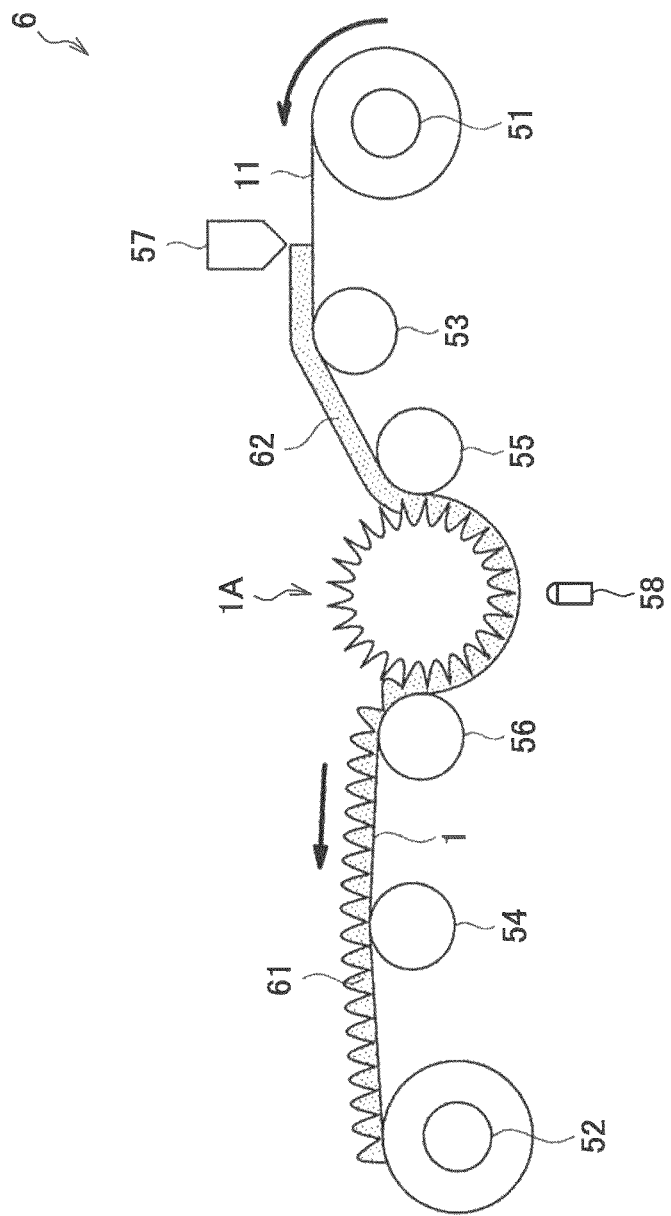
FIG. 8 is an explanatory diagram illustrating an example of a transfer device for manufacturing the optical body according to the embodiment.

Now, a second manufacturing method of the optical body 1 according to the present embodiment will be described with reference to FIGS. 5 to 8. FIG. 5 is a perspective view for describing an optical body master 1A for manufacturing the optical body 1 according to the present embodiment. FIG. 6 is an explanatory diagram illustrating an example of an exposure device for manufacturing the optical body master 1A illustrated in FIG. 5. FIG. 7 is an explanatory diagram illustrating an example of an etching device for manufacturing the optical body master 1A illustrated in FIG. 5. FIG. 8 is an explanatory diagram illustrating an example of a transfer device for manufacturing the optical body 1 according to the present embodiment.

Specifically, in the second manufacturing method of the optical body 1 according to the present embodiment, first, the optical body master 1A having a concave-convex structure 5 formed on its surface is manufactured, the concave-convex structure 5 including the macro concave-convex structure 13 and the micro concave-convex structure 14 superimposed on each other. Next, using the manufactured optical body master 1A, the concave-convex structure 5 is transferred to the base material 11 in a sheet form; thus, the optical body 1 in which the concave-convex structure 5 is formed on the surface of the base material 11 is continuously manufactured.

First, the optical body master 1A will be described with reference to FIG. 5. As illustrated in FIG. 5, the optical body master 1A is formed of a master base material 3 in a hollow round column form, for example. The concave-convex structure 5 is formed on the outer circumferential surface of the master base material 3.

The master base material 3 is a glass body in a round cylindrical shape, for example, and is formed using quartz glass, for example. Note that the material of the master base material 3 is not particularly limited, and may be fused quartz glass, synthetic quartz glass, or the like, as long as the material has high $SiO_2$ purity. The size of the master base material 3 is not particularly limited; the axial length may be more than or equal to 100 mm, the outer diameter may be more than or equal to 50 mm and less than or equal to 300 mm, and the thickness may be more than or equal to 2 mm and less than or equal to 50 mm, for example.

The concave-convex structure 5 is a structure in which a micro concave-convex structure (second concave-convex structure) whose average concave-convex period is less than or equal to a wavelength in the visible light region is superimposed on a macro concave-convex structure (first concave-convex structure) whose average concave-convex period is larger than a wavelength in the visible light region. Here, the macro concave-convex structure may be, for example, an antiglare structure with an average concave-convex period of more than or equal to 1 μm and less than or equal to 100 μm, and the micro concave-convex structure may be, for example, a moth-eye structure with an average concave-convex period of more than or equal to 100 nm and less than or equal to 350 nm.

The optical body master 1A having this concave-convex structure 5 formed on its outer circumferential surface can be manufactured by using, for example, the manufacturing method described above as the first manufacturing method. Specifically, the optical body master 1A can be manufactured by using an exposure device 2 illustrated in FIG. 6 and an etching device 4 illustrated in FIG. 7.

Here, the exposure device 2 and the etching device 4 for manufacturing the optical body master 1A will be described with reference to FIGS. 6 and 7.

First, the exposure device 2 illustrated in FIG. 6 will be described. The exposure device 2 illustrated in FIG. 6 is a laser writing device that is used in the light exposure step described with reference to FIG. 3B.

As illustrated in FIG. 6, the exposure device 2 includes a laser light source 21, a first mirror 23, a photodiode (PD) 24, a light collecting lens 26, an electro-optic deflector (EOD) 29, a collimator lens 28, a control mechanism 37, a second mirror 31, a movable optical table 32, a spindle motor 35, and a turntable 36. The master base material 3 is mounted on the turntable 36 and is rotatable.

The laser light source 21 is a light source that generates laser light 20A for exposing to light a resist layer formed as a film on the surface of the master base material 3, and is, for example, a semiconductor laser that emits laser light of a wavelength in the blue light region of 400 nm to 500 nm. The laser light 20A emitted from the laser light source 21 goes straight while remaining a parallel beam, and is reflected at the first mirror 23. The laser light 20A reflected at the first mirror 23 is collected to the electro-optic deflector 29 by the light collecting lens 26, and is then made into a parallel beam again by the collimator lens 28. The laser light 20A made into a parallel beam is reflected by the second mirror 31, and is guided onto the movable optical table 32 horizontally and parallely.

The first mirror 23 is formed of a polarizing beam splitter, and has the function of reflecting one polarized component and transmitting the other polarized component. The polarized component transmitted through the first mirror 23 is received by the photodiode 24, and is photoelectrically converted. A light receiving signal photoelectrically converted by the photodiode 24 is inputted to the laser light source 21, and the laser light source 21 modulates the laser light 20A on the basis of the inputted light receiving signal.

The electro-optic deflector 29 is an element capable of controlling the irradiation position of laser light 20A. By means of the electro-optic deflector 29, the exposure device 2 can also change the irradiation position of laser light 20A guided onto the movable optical table 32.

The movable optical table 32 includes a beam expander (BEX) 33 and an objective lens 34. The laser light 20A guided to the movable optical table 32 is shaped into a desired beam shape by the beam expander 33, and is then emitted to the resist layer formed as a film on the surface of the master base material 3, via the objective lens 34. The master base material 3 is mounted on the turntable 36 connected to the spindle motor 35, and is rotatable.

Here, while the master base material 3 is rotated by the turntable 36, laser light 20A is moved in the axial direction of the master base material 3 and the resist layer is intermittently irradiated with laser light; thus, the resist layer is exposed to light. The movement of laser light 20A is performed by moving the movable optical table 32 in the direction of arrow R.

The exposure device 2 includes the control mechanism 37 for causing the irradiation positions of laser light 20A to form a two-dimensional pattern, such as a rectangular lattice form or a hexagonal lattice form. The control mechanism 37 includes a formatter 38 and a driver 39, and controls the irradiation with laser light 20A. The driver 39 controls the output of the laser light source 21 on the basis of a control signal generated by the formatter 38. Thereby, the irradiation of the resist layer with laser light 20A is controlled.

The exposure device 2 synchronizes the control signal from the formatter 38 with a servo signal of the spindle motor 35 for each track so that the two-dimensional pattern is in synchronization for each track. Therefore, by setting the rotation rate of the turntable 36, the modulation frequency of laser light 20A, the feed pitch of the movable optical table 32, and the like to appropriate values, the exposure device 2 can irradiate the resist layer with laser light 20A in a periodic two-dimensional pattern.

Now, the etching device 4 illustrated in FIG. 7 will be described. The etching device 4 is used in the etching steps described with reference to FIGS. 3D and 3G. The etching device 4 illustrated in FIG. 7 is, for example, a reactive ion etching (RIE) device.

As illustrated in FIG. 7, the etching device 4 includes an etching reaction tank 41, a round columnar electrode 42, which is a cathode, and a counter electrode 43, which is an anode. The round columnar electrode 42 is provided at the center of the etching reaction tank 41 in a manner that the master base material 3 is detachable. The round columnar electrode 42 has, for example, a round column surface that is substantially the same as or similar to the master base material 3, and preferably has a round column surface that is smaller than the inner circumferential surface of the master base material 3. The round columnar electrode 42 is connected to a radio frequency power source (RF) 45 with a frequency of 13.56 MHz, for example, via a blocking capacitor 44. On the other hand, the counter electrode 43 is provided on the inner side of the etching reaction tank 41 and is connected to a ground.

In the etching device 4, the radio frequency power source 45 applies a radio frequency voltage between the counter electrode 43 and the round columnar electrode 42; thus, plasma occurs between the counter electrode 43 and the round columnar electrode 42. Here, the counter electrode 43 does not change in potential because it is connected to the ground. On the other hand, the round columnar electrode 42 becomes negative in potential due to occurrence of a voltage drop, because the blocking capacitor blocks a circuit. Consequently, in the etching reaction tank 41, an electric field occurs in a direction perpendicular to the round column surface of the round columnar electrode 42; thus, positive ions in the plasma enter the outer circumferential surface of the master base material 3 perpendicularly, so that etching with perpendicular anisotropy can be performed.

Using the exposure device 2 and the etching device 4 described above, the steps described in the first manufacturing method are executed; thus, the optical body master 1A illustrated in FIG. 5 can be manufactured.

Furthermore, the concave-convex structure 5 formed on the outer circumferential surface of the optical body master 1A is transferred to the base material 11; thus, the optical body 1 according to the present embodiment can be manufactured. Specifically, the optical body 1 according to the present embodiment can be manufactured by using a transfer device 6 illustrated in FIG. 8.

Here, the transfer device 6 for manufacturing the optical body 1 using the optical body master 1A will be described with reference to FIG. 8. The transfer device 6 illustrated in FIG. 8 is, for example, a nanoimprint device of a roll-to-roll system.

As illustrated in FIG. 8, the transfer device 6 includes the optical body master 1A, a base material supply roll 51, a take-up roll 52, guide rolls 53 and 54, a nip roll 55, a separation roll 56, an applicator device 57, and a light source 58.

The base material supply roll 51 is a roll around which the base material 11 in a sheet form is wound in a roll form. The take-up roll 52 is a roll that takes up the optical body 1 on which a resin layer 62 with the concave-convex structure 5 transferred thereto is laminated. The guide rolls 53 and 54 are rolls that convey the base material 11, and are arranged on a conveyance path in the transfer device 6 in a manner that the base material 11 can be conveyed from the base material supply roll 51 to the take-up roll 52.

The nip roll 55 is a roll that puts the base material 11 on which the resin layer 62 is laminated in close contact with the optical body master 1A in a round cylindrical shape. The separation roll 56, after the concave-convex structure 5 is transferred to the resin layer 62, separates the base material 11 on which the resin layer 62 is laminated from the optical body master 1A. The base material supply roll 51, the take-up roll 52, the guide rolls 53 and 54, the nip roll 55, and the separation roll 56 are not particularly limited in material; for example, any of a metal such as stainless steel, rubber, a silicone resin, and the like can be selected as appropriate to be used.

The applicator device 57 includes an applicating means such as a coater, and applies a photocurable resin composition to the base material 11 to form the resin layer 62. The applicator device 57 may be, for example, a gravure coater, a wire bar coater, a die coater, or the like. The light source 58 is a light source that emits light of a wavelength capable of curing the photocurable resin composition, and may be, for example, an ultraviolet lamp or the like.

The photocurable resin composition is a resin that decreases in fluidity and cures by being irradiated with light of a predetermined wavelength. Specifically, the photocurable resin composition may be an ultraviolet curable resin such as a polyacrylic acrylate. The photocurable resin composition may contain an initiator, a filler, a functional additive, a solvent, an inorganic material, a pigment, an antistatic agent, a sensitizing dye, etc., as necessary.

As the initiator, for example, 2,2-dimethoxy-1,2-diphenylethan-1-one, 1-hydroxy-cyclohexyl phenyl ketone, 2-hydroxy-2-methyl-1-phenylpropan-1-one, or the like may be used. As the filler, either of inorganic fine particles and organic fine particles may be used; as the inorganic fine particles, for example, metal oxide fine particles of $SiO_2$, $TiO_2$, $ZrO_2$, $SnO_2$, $Al_2O_3$, or the like can be used. As the functional additive, for example, a leveling agent, a surface conditioner, an absorber, an antifoaming agent, or the like can be used.

In the transfer device 6, first, the base material 11 is continuously fed from the base material supply roll 51 via the guide roll 53. The photocurable resin composition is applied to the fed base material 11 by the applicator device 57, and thus the resin layer 62 is laminated, and further, the base material 11 on which the resin layer 62 is laminated is put in close contact with the optical body master 1A by the nip roll 55. Thereby, the concave-convex structure 5 formed on the outer circumferential surface (i.e., transfer surface) of the optical body master 1A is transferred to the resin layer 62. After the concave-convex structure 5 is transferred, the resin layer 62 is cured by being irradiated with light from the light source 58. Subsequently, the base material 11 on which the cured resin layer 62 is laminated (the optical body 1) is peeled off from the optical body master 1A by the separation roll 56 and conveyed by the guide roll 54, and is then taken up by the take-up roll 52.

In this manner, the optical body 1 in a sheet form to which the concave-convex structure 5 formed on the optical body master 1A is transferred can be continuously manufactured.

The second manufacturing method of the optical body according to the present embodiment can be performed by using the devices described above.

Specifically, the first resist layer 15 is formed as a film on the outer circumferential surface of the master base material 3 formed of quartz glass in a round cylindrical shape, and thermal lithography using laser light is performed by the exposure device 2 illustrated in FIG. 6 to form the latent image 15A on the first resist layer 15. Subsequently, development processing is performed on the light-exposed master base material 3 to form a pattern on the first resist layer 15, and then the master base material 3 is etched by the etching device 4 illustrated in FIG. 7; thus, the micro concave-convex structure 14 is formed on the outer circumferential surface of the master base material 3.

Next, the second resist layer 16 is formed as a film on the outer circumferential surface of the master base material 3 on which the micro concave-convex structure 14 is formed, and the macro concave-convex structure 13 is formed on the second resist layer 16. Subsequently, the master base material 3 is etched by the etching device 4 illustrated in FIG. 7; thus, the macro concave-convex structure 13 and the micro concave-convex structure 14 are formed to be superimposed on the outer circumferential surface of the master base material 3. Through these steps, the optical body master 1A in which the micro concave-convex structure 14 is superimposed on the macro concave-convex structure 13 is manufactured.

Furthermore, the concave-convex structure 5 on the outer circumferential surface of the manufactured optical body master 1A is transferred to the base material 11 by the transfer device 6 illustrated in FIG. 8; thus, the optical body 1 is manufactured.

By this second manufacturing method, the concave-convex structure 5 can be transferred from the optical body master 1A to the optical body 1 by using a nanoimprint technology of a roll-to-roll system; thus, the optical body 1 in a sheet form with a large area can be manufactured continuously at high speed.

The optical body master 1A is described above as a glass body in a round cylindrical shape, but the present invention is not limited to the above example. For example, the optical body master 1A may be a glass body in a flat-plate shape. In such a case, the concave-convex structure 5 can be transferred from the optical body master 1A to the optical body 1 by using the transfer device 6 of a sheet-fed system.

Methods for manufacturing the optical body 1 according to the present embodiment have been described above.

EXAMPLES

3. Examples

The optical body 1 according to the above embodiment will now be specifically described with reference to Examples and Comparative Examples. Examples shown below are examples of the conditions for showing the feasibility and effect of the optical body 1 according to the above embodiment and the method for manufacturing the optical body 1, and the optical body 1 of the present invention and the method for manufacturing the optical body 1 are not limited to Examples below.

(3.1. Manufacture of Optical Body)

The optical body 1 was manufactured by the following steps.

Example 1

First, the first resist layer 15 containing tungsten metal oxide was formed as a film on the outer circumferential surface of the master base material 3 formed of quartz glass in a round cylindrical shape. Next, thermal lithography using laser light was performed by the exposure device 2 illustrated in FIG. 6 to form the latent image 15A with a dot array pattern in a hexagonal lattice form on the first resist layer 15.

The light-exposed dot array pattern is an arrangement (an arrangement in a hexagonal lattice form) in which dots are arranged with a predetermined dot pitch along tracks in the circumferential direction of the master base material 3, and adjacent tracks are shifted from each other by half the dot pitch in a staggered manner. The dot pitch in the same track is approximately 230 nm, and a track pitch in the axial direction of the master base material 3 is approximately 150 nm.

Subsequently, development processing was performed on the master base material 3 using an alkaline developer (NMD3 produced by TOKYO OHKA KOGYO CO., LTD.) to dissolve the resist of the light-exposed portion; thus, a dot array pattern was formed on the first resist layer 15. Next, with the first resist layer 15 used as a mask, the master base material 3 was etched using $CHF_3$ gas by the etching device 4 illustrated in FIG. 7; thus, the micro concave-convex structure 14 was formed on the outer circumferential surface of the master base material 3. In this etching step, the master base material 3 was etched until the height of the projecting part 141 of the micro concave-convex structure 14 became approximately 250 nm.

Furthermore, a nanoimprint lithography resist of a cationic polymerization type, which is an ultraviolet curable resin, was dissolved in a solvent, and the solution was applied to the master base material 3 on which the micro concave-convex structure 14 was formed; thus, the second resist layer 16 was formed. Then, the master base material 3 was heated at 100° C. for five minutes, so that the solvent in the second resist layer 16 was removed.

Here, a rough-surface film on which the macro concave-convex structure 13 was formed was put in close contact with the second resist layer 16, and irradiation with an ultraviolet ray was performed with 1000 mJ/cm$^2$ to cure the second resist layer 16. Then, the rough-surface film was peeled off; thus, the macro concave-convex structure 13 was formed on the second resist layer 16. The arithmetic average roughness Ra of the macro concave-convex structure 13 of the rough-surface film was 0.449 μm. Note that the arithmetic average roughness Ra of the rough-surface film was measured with a measuring force of 100 μN at a rate of measurement of 100 μm/sec using Surfcorder ET200 of Kosaka Laboratory Ltd.

Subsequently, with the second resist layer 16 on which the macro concave-convex structure 13 was formed used as a mask, the master base material 3 was etched for six hours using CHF$_3$ gas with a gas pressure of 0.5 Pa and an input electric power of 250 W by the etching device 4 illustrated in FIG. 7. In this etching, the ratio of the etching rate of the second resist layer 16 to the etching rate of the master base material 3 was about 1:2.

By this etching step, the macro concave-convex structure 13 and the micro concave-convex structure 14 were superimposed on the surface of the master base material 3. The arithmetic average roughness Ra of the master base material 3 after the etching was 0.707 μm.

Through the above steps, the optical body master 1A in which the micro concave-convex structure 14 was superimposed on the macro concave-convex structure 13 was manufactured. Subsequently, the macro concave-convex structure 13 and the micro concave-convex structure 14 formed on the outer circumferential surface of the optical body master 1A were transferred to the resin layer 62 by the transfer device 6 illustrated in FIG. 8, and the optical body 1 was manufactured. Note that a polyethylene terephthalate film was used as the base material 11 of the optical body 1. A polyacrylic acrylate, which is an ultraviolet curable resin, was used as the resin layer 62, and the resin layer 62 was irradiated with an ultraviolet ray with 1000 mJ/cm$^2$ to be cured.

Example 2

The optical body 1 was manufactured by the same method as the method in Example 1, except that the arithmetic average roughness Ra of the rough-surface film put in close contact with the second resist layer 16 in Example 1 was changed to 0.187 μm. The arithmetic average roughness Ra of the master base material 3 after the etching was 0.385 μm.

Example 3

The optical body 1 was manufactured by the same method as the method in Example 1, except that the arithmetic average roughness Ra of the rough-surface film put in close contact with the second resist layer 16 in Example 1 was changed to 0.606 μm and the gas used in the etching in forming the macro concave-convex structure 13 on the master base material 3 was changed to CF$_4$. In this etching, the ratio of the etching rate of the second resist layer 16 to the etching rate of the master base material 3 was about 3:1. The arithmetic average roughness Ra of the master base material 3 after the etching was 0.271 μm.

Example 4

The optical body 1 was manufactured by the same method as the method in Example 1, except that the arithmetic average roughness Ra of the rough-surface film put in close contact with the second resist layer 16 in Example 1 was changed to 0.12 μm. The arithmetic average roughness Ra of the master base material 3 after the etching was 0.186 μm.

Comparative Example 1

A polyethylene terephthalate film was used as the base material 11, and an antiglare (AG) layer with a haze value of 7% was laminated on one surface of the base material 11 by wet coating. On the AG layer, a multilayer thin film of SiO$_x$ (film thickness: 3 nm), Nb$_2$O$_5$ (film thickness: 20 nm), SiO$_2$ (film thickness: 35 nm), Nb$_2$O$_5$ (film thickness: 35 nm), and SiO$_2$ (film thickness: 100 nm) in this order was formed as a film by a sputtering method to serve as an antireflection layer. Thus, an optical body was manufactured.

Comparative Example 2

A cellulose triacetate (TAC) film was used as the base material 11, and an AG hard coat layer with a haze value of 9% was laminated on one surface of the base material 11 by wet coating. Next, a resin layer containing a filler and having a lower refractive index than the AG hard coat layer was laminated on the AG hard coat layer by wet coating to serve as an antireflection layer. Thus, an optical body was manufactured.

Comparative Example 3

The optical body 1 was manufactured by the same method as the method in Example 1, except that the master base material 3 on which only the micro concave-convex structure 14 was formed before the formation of the macro concave-convex structure 13 in Example 1 was used as the optical body master 1A.

Comparative Example 4

A commercially available antiglare film (produced by Daiso) in which an antiglare layer with a haze value of approximately 20% and a hard coat layer are laminated on a polyethylene terephthalate film was purchased and used as an optical body.

(3.2. Evaluation Results of Optical Bodies)
(Observation Results of Optical Bodies by Electron Microscope)

First, with reference to FIGS. 9A to 12C, description will be given on results of structural observation of optical bodies by a scanning electron microscope (SEM) and a transmission electron microscope (TEM).

First, the plane structures of optical bodies were observed using the SEM. The results are shown in FIGS. 9A to 10B.

Figure 9A:
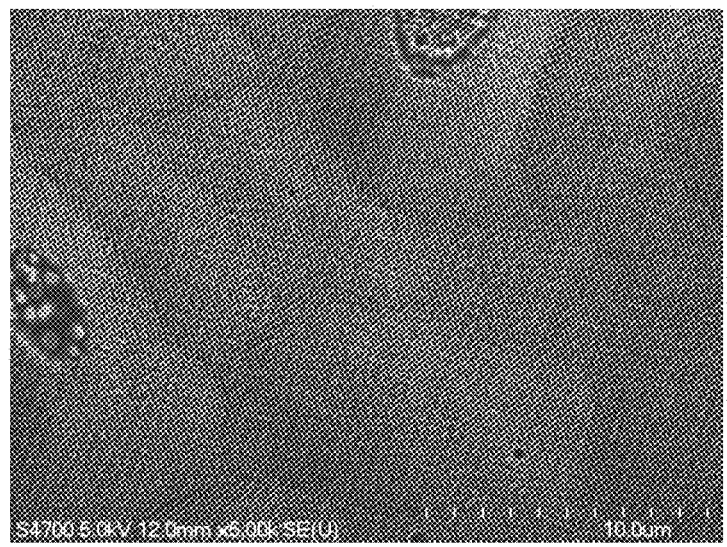
FIG. 9A is a SEM image of the surface of an optical body according to Example 1.
Figure 9B:
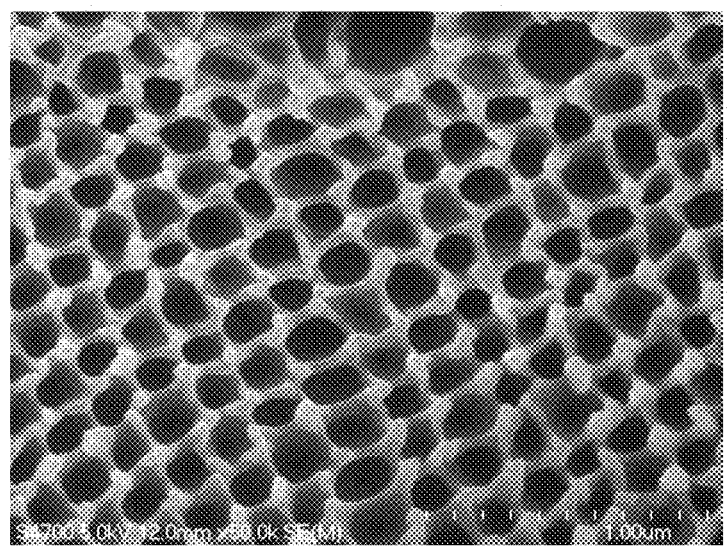
FIG. 9B is a SEM image of the surface of an optical body according to Example 1.
Figure 10A:
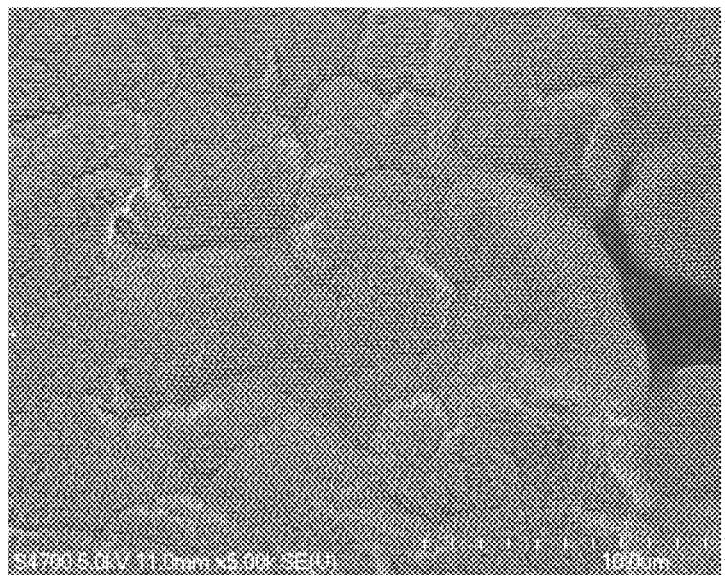
FIG. 10A is a SEM image of the surface of an optical body according to Example 3.
Figure 10B:
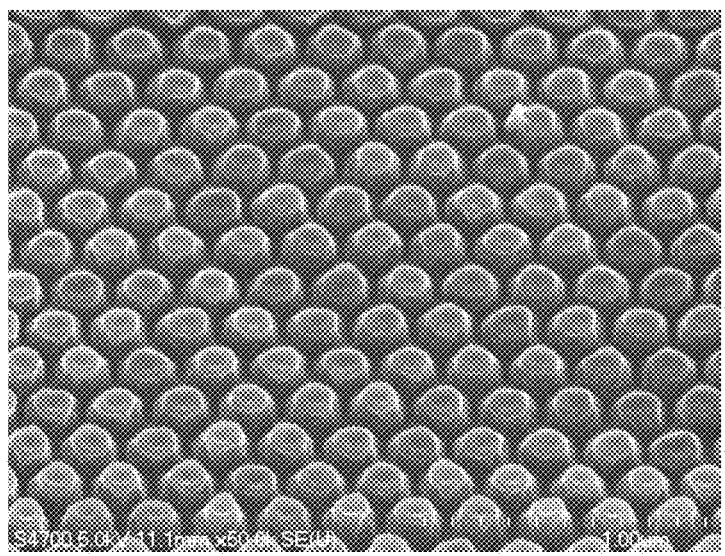
FIG. 10B is a SEM image of the surface of an optical body according to Example 3.

Here, FIGS. 9A and 9B are SEM images of the surface of the optical body according to Example 1, and FIGS. 10A and 10B are SEM images of the surface of the optical body according to Example 3. FIGS. 9A and 10A are SEM images with a 5000-fold magnification, and FIGS. 9B and 10B are SEM images with a 50000-fold magnification.

According to FIGS. 9A and 10A, a micrometer-scale concave-convex structure is formed on the surfaces of the optical bodies according to Examples 1 and 3. This micrometer-scale concave-convex structure corresponds to a macro concave-convex structure (first concave-convex structure) whose average concave-convex period is larger than a wavelength in the visible light region. In addition, on the surface of the macro concave-convex structure of the optical bodies according to Examples 1 and 3, a micro concave-convex structure (second concave-convex structure), which is finer, is superimposed on the macro concave-convex structure.

According to FIGS. 9B and 10B, in the micro concave-convex structure formed on the surfaces of the optical bodies according to Examples 1 and 3, projecting parts are formed in a two-dimensional arrangement with periodicity. Specifically, the two-dimensional arrangement of the projecting parts in the micro concave-convex structure is an arrangement with periodicity in a so-called hexagonal lattice form, in which rows of projecting parts lining up at equal intervals are arranged in a staggered manner.

Figure 11:
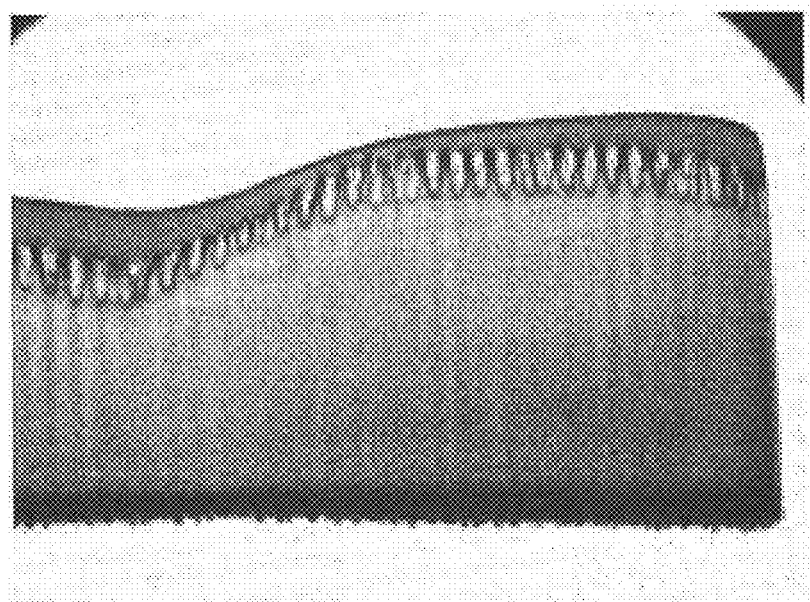
FIG. 11 is a TEM image of a macro concave-convex structure of the optical body according to Example 1.
Figure 12A:
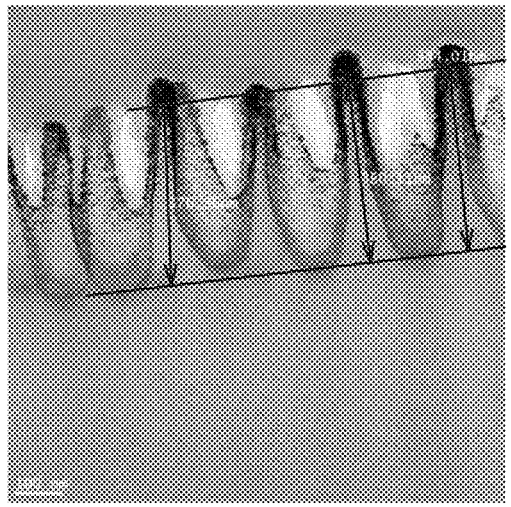
FIG. 12A is a TEM image of a micro concave-convex structure of the optical body according to Example 1.
Figure 12B:
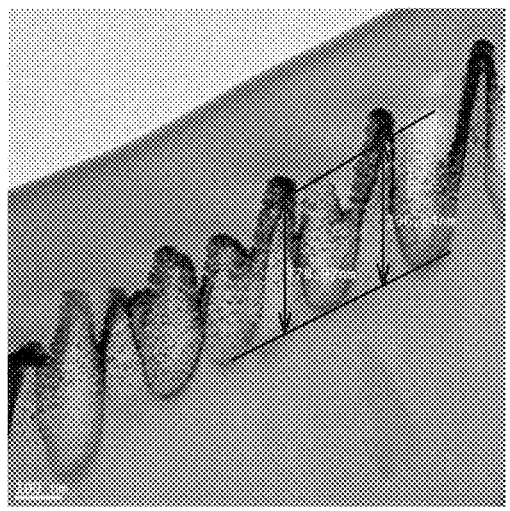
FIG. 12B is a TEM image of a micro concave-convex structure of the optical body according to Example 1.
Figure 12C:
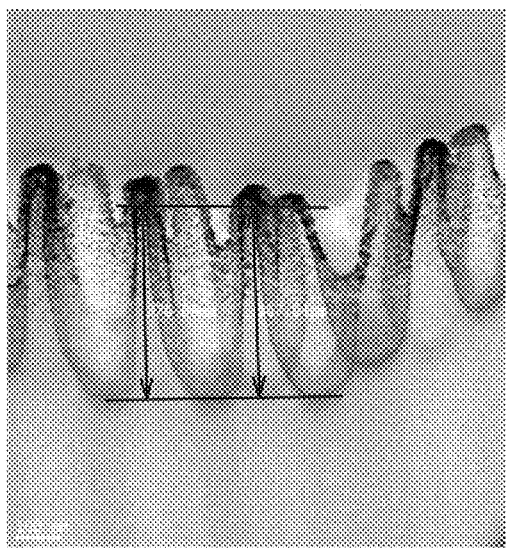
FIG. 12C is a TEM image of a micro concave-convex structure of the optical body according to Example 1.

Next, the cross-sectional structures of optical bodies were observed using the TEM. The results are shown in FIGS. 11 to 12C. FIG. 11 is a TEM image of the macro concave-convex structure of the optical body according to Example 1. FIGS. 12A to 12C are TEM images of the micro concave-convex structure of the optical body according to Example 1. FIG. 12A is a TEM image in which a peak part of the macro concave-convex structure is enlarged, FIG. 12B is a TEM image in which a slope part of the macro concave-convex structure is enlarged, and FIG. 12C is a TEM image in which a valley part of the macro concave-convex structure is enlarged.

According to FIG. 11, projecting parts of the micro concave-convex structure of the optical body according to Example 1 extend in the direction normal to the flat plane of the base material, and are aligned in one direction in the entire base material.

Furthermore, according to FIGS. 12A to 12C, projecting parts of the micro concave-convex structure are formed to extend in the direction normal to the flat plane of the base material, on each of the surfaces of the peak part, the valley part, and the slope part in the macro concave-convex structure of the optical body. In addition, the height of an intermediate projecting part formed in the slope part of the macro concave-convex structure is smaller than the height of a valley-side projecting part formed in the valley part of the macro concave-convex structure and the height of a peak-side projecting part formed in the peak part of the macro concave-convex structure. Specifically, the height of the intermediate projecting part was approximately 270 nm to 300 nm, and the heights of the valley-side projecting part and the peak-side projecting part were approximately 360 to 390 nm.

In FIGS. 12A to 12C, a base line that virtually connects two bottom parts positioned at both sides of the top of a certain projecting part was assumed, and the distance between the top and an intersection point of this base line and a straight line drawn from the top along the direction normal to the flat plane of the base material was measured as the height of the projecting part.

(Evaluation of Antireflection Capability of Optical Body)

Figure 13A:
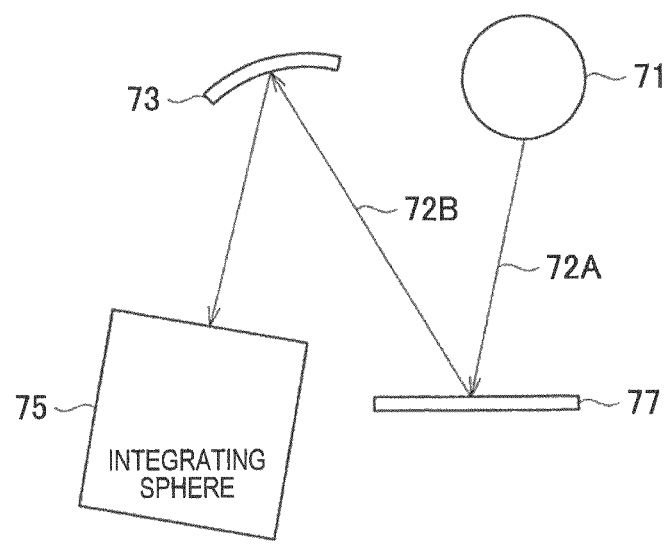
FIG. 13A is an explanatory diagram for describing an optical system of regular reflection spectroscopy.
Figure 13B:
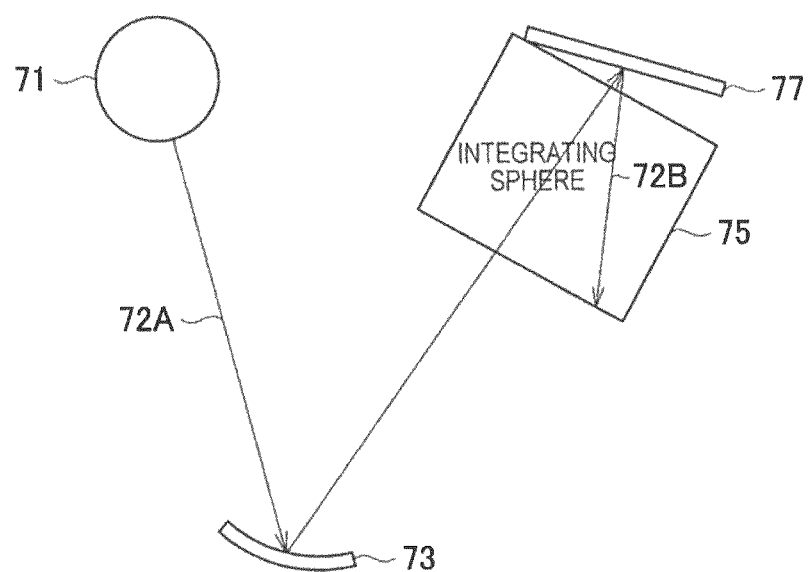
FIG. 13B is an explanatory diagram for describing an optical system of diffuse reflection spectroscopy.
Figure 14:
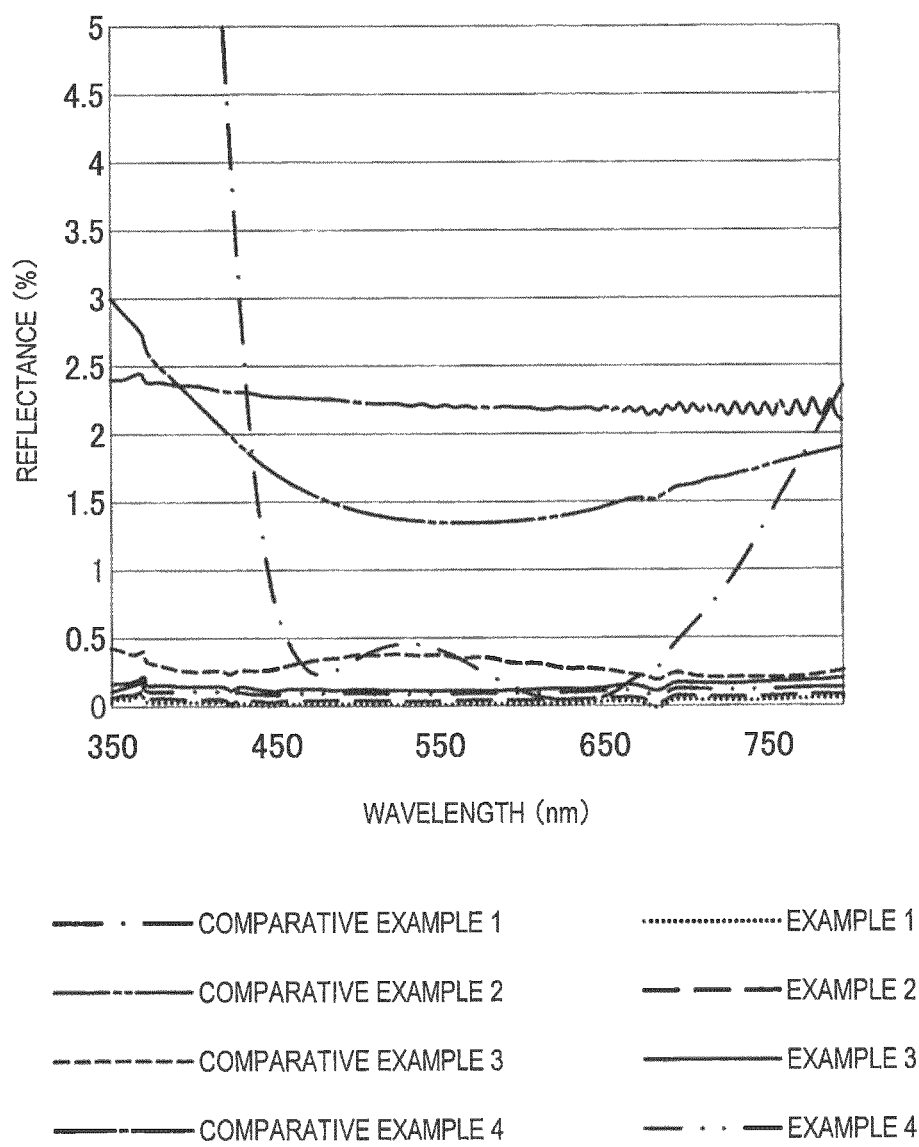
FIG. 14 is a graph diagram showing measurement results of spectral regular reflectance in regular reflection.

Now, with reference to FIGS. 13A to 15, description will be given on evaluation results of the antireflection capability of the optical body according to the present embodiment. FIG. 13A is an explanatory diagram for describing an optical system of regular reflection spectroscopy, and FIG. 13B is an explanatory diagram for describing an optical system of diffuse reflection spectroscopy. FIG. 14 is a graph diagram showing measurement results of spectral regular reflectance in regular reflection, and FIG. 15 is a graph diagram showing measurement results of spectral diffuse reflectance in diffuse reflection.

First, a method for evaluating the antireflection capability of the optical body according to the present embodiment will be described with reference to FIGS. 13A and 13B. As illustrated in FIG. 13A, in regular reflection spectroscopy, light 72A from a light source 71 is emitted directly to a sample 77. Reflected light 72B from the sample 77 is collected at a spherical mirror 73 and guided to an integrating sphere 75, and then homogenized by multiple reflection in the integrating sphere 75, and is then detected. As illustrated in FIG. 13B, in diffuse spectroscopy, light 72A from the light source 71 is reflected at the spherical mirror 73 and then emitted to the sample 77 provided in the integrating sphere 75. Reflected light 72B from the sample 77 is homogenized by multiple reflection in the integrating sphere 75, and is then detected.

Figure 15:
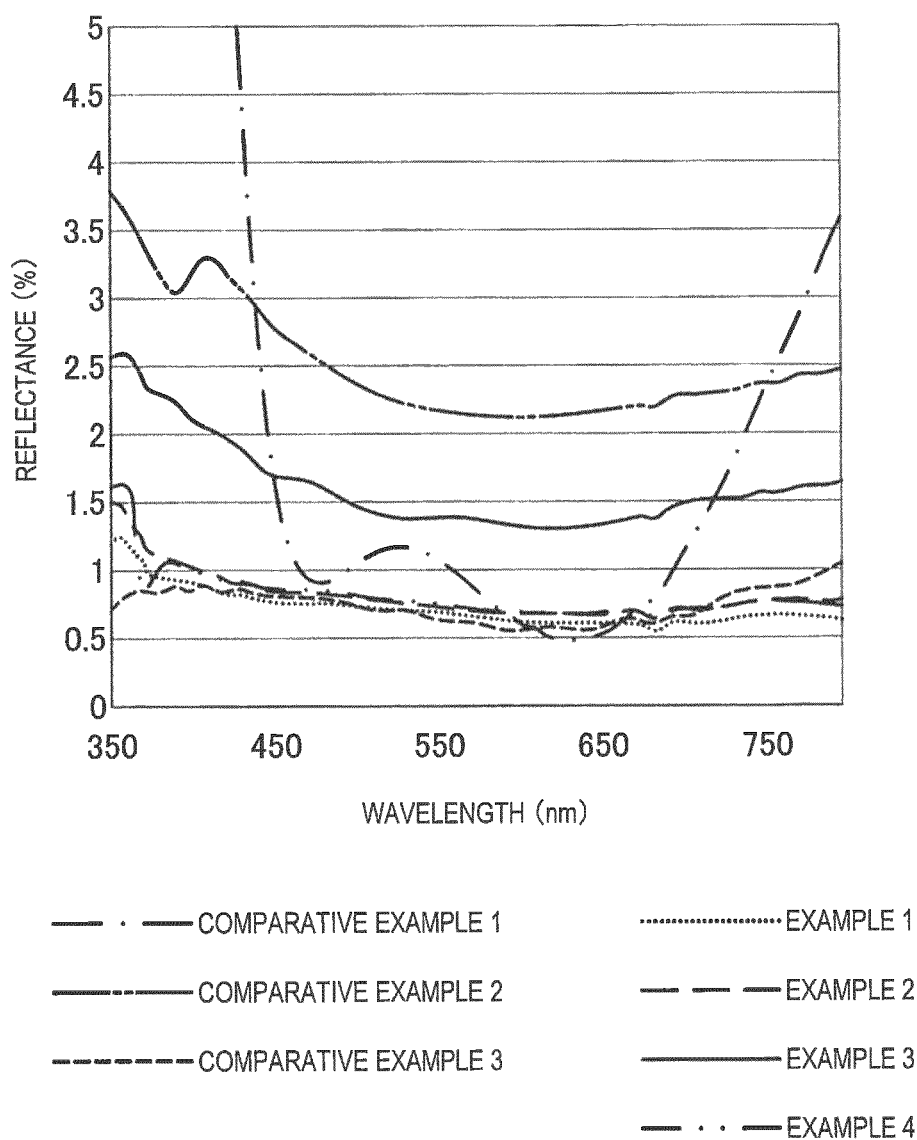
FIG. 15 is a graph diagram showing measurement results of spectral diffuse reflectance in diffuse reflection.

Here, FIG. 14 shows measurement results of spectral regular reflectance in regular reflection, and FIG. 15 shows measurement results of spectral diffuse reflectance in diffuse reflection. In measuring the reflectance, a spectrophotometer V550 and an absolute reflectance measuring device ARV474S, produced by JASCO Corporation, were used.

As shown in FIG. 14, the optical bodies according to Examples 1 to 4 exhibit lower spectral regular reflectance than Comparative Examples 1 to 4 for any wavelength in the visible light region, indicating the ability to prevent regular reflection.

On the other hand, Comparative Example 1, which is given antireflection capability by the multilayer thin film, can prevent regular reflection for only light in a limited wavelength region of more than or equal to 450 nm and less than or equal to 650 nm, and exhibits an increase in spectral regular reflectance in a wavelength region of less than 450 nm or more than 650 nm. Comparative Example 2, which is given antireflection capability by the resin layer, and Comparative Example 4, which is a commercially available antiglare film, exhibit higher spectral regular reflectance than Examples 1 to 4, indicating insufficient ability to prevent regular reflection. Furthermore, Comparative Example 3, in which only the micro concave-convex structure is formed, exhibits relatively low spectral regular reflectance for any wavelength in the visible light region, but exhibits higher spectral regular reflectance than Examples 1 to 4.

As shown in FIG. 15, the optical bodies according to Examples 1 to 4 exhibit relatively lower spectral diffuse reflectance than Comparative Examples 1 and 2 in the entire visible light region, indicating the ability to prevent diffuse reflection.

Note that the optical body according to Example 3 exhibits higher spectral diffuse reflectance than the optical bodies according to Examples 1 and 2. This is presumably because in Example 3, the etching rate of the resist layer is higher than the etching rate of the master base material in the etching step of superimposing the micro concave-convex structure on the macro concave-convex structure. In Example 3, due to the above etching condition, a projecting part of the micro concave-convex structure has a smaller height than those in Examples 1 and 2 and Comparative Example 3. For this reason, Example 3 has lower antireflection capability, exhibiting higher spectral diffuse reflectance.

On the other hand, Comparative Example 1, which is given antireflection capability by the multilayer thin film, can prevent diffuse reflection for only light in a limited wavelength region of more than or equal to 450 nm and less than or equal to 650 nm. Specifically, Comparative Example 1 exhibits higher spectral diffuse reflectance than Examples 1 to 4 in a wavelength region of less than 450 nm or more than 650 nm. Comparative Example 2, which is given antireflection capability by the resin layer, exhibits higher spectral diffuse reflectance than Examples 1 to 4, indicating insufficient ability to prevent diffuse reflection. Furthermore, Comparative Example 3, in which only the micro concave-convex structure is formed, exhibits a spectral diffuse reflectance similar to those of Examples 1, 2, and 4.

Furthermore, a color tone of regular reflected light of the optical body according to the present embodiment was measured, and luminous reflectance (Y) and reflection chromaticity (a*, b*) were calculated. Here, luminous reflectance of regular reflected light (also called spectral regular luminous reflectance) is a Y value of (Y, x, y) when the color of regular reflected light is expressed in Yxy color space, and indicates the lightness of color of regular reflected light. That is, lower spectral regular luminous reflectance indicates lower lightness of regular reflected light, indicating suppression of regular reflection. Reflection chromaticity (a*, b*) indicates the color tone of regular reflected light. In measuring the color tone of regular reflected light, a haze meter HM-150 produced by MURAKAMI COLOR RESEARCH LABORATORY CO., Ltd. was used. Measurement results are shown in Table 1 below.

TABLE 1

|  | Y | x | y | a* | b* |
| --- | --- | --- | --- | --- | --- |
| Example 1 | 0.04 | 0.32 | 0.34 | −0.02 | 0.06 |
| Example 2 | 0.05 | 0.32 | 0.33 | 0.04 | 0.03 |
| Example 3 | 0.12 | 0.31 | 0.32 | 0.14 | −0.1 |
| Example 4 | 0.07 | 0.313 | 0.319 | 0.09 | −0.06 |
| Comparative Example 1 | 0.32 | 0.2 | 0.15 | 5.28 | −14.65 |
| Comparative Example 2 | 1.38 | 0.3 | 0.3 | 1.89 | −3.58 |
| Comparative Example 3 | 0.35 | 0.31 | 0.36 | −1.26 | 0.84 |
| Comparative Example 4 | 2.19 | 0.31 | 0.33 | −0.01 | −0.54 |

According to Table 1, the optical bodies according to Examples 1 to 4 exhibit lower spectral regular luminous reflectance (Y value) than the optical bodies according to Comparative Examples 1 to 4, indicating lower lightness of color of regular reflected light. That is, the optical bodies according to Examples 1 to 4 suppress regular reflection more than the optical bodies according to Comparative Examples 1 to 4. Specifically, spectral regular luminous reflectances (Y values) of the optical bodies according to Examples 1 to 4 are 0.3% or less. On the other hand, spectral regular luminous reflectances of the optical bodies according to Comparative Examples 1 to 4 are more than 0.3%, which indicates that the optical bodies according to Comparative Examples 1 to 4 cannot sufficiently suppress regular reflection.

(Evaluation Results of Transparency of Optical Body)

Now, evaluation results of transparency of the optical body according to the present embodiment will be described. Specifically, for the optical bodies according to Examples 1 to 4 and Comparative Examples 1 to 4, a haze value and total light transmittance were measured. Here, a haze value is an index indicating the turbidity (haze) of an optical body, and a higher value indicates that the optical body has a higher light scattering property and has higher antiglare capability. Total light transmittance is an index indicating the transparency of an optical body. In measuring the haze value and the total light transmittance, a haze meter HM-150 produced by MURAKAMI COLOR RESEARCH LABORATORY CO., Ltd. was used. Measurement results are shown in Table 2 below.

TABLE 2

|  | Haze value [%] | Total light transmittance [%] |
| --- | --- | --- |
| Example 1 | 74.1 | 93.4 |
| Example 2 | 43.5 | 93.8 |
| Example 3 | 40.9 | 92.8 |
| Example 4 | 13.8 | 93.3 |
| Comparative Example 1 | 18.1 | 94.5 |
| Comparative Example 2 | 9 | 94.3 |
| Comparative Example 3 | 0.5 | 95.3 |
| Comparative Example 4 | 20.7 | 90 |

According to Table 2, the optical bodies according to Examples 1 to 4 have total light transmittances comparable to those of the optical bodies according to Comparative Examples 1 to 4 and exhibit high haze values, indicating high transparency and high antiglare capability. Specifically, the haze values of Examples 1 to 4 are 5% or more, more specifically 10% or more.

The above evaluation results demonstrate that the optical bodies according to Examples 1 to 4 have both antireflection capability and antiglare capability. This is because on the surfaces of the optical bodies according to Examples 1 to 4, a micro concave-convex structure whose average concave-convex period is less than or equal to a wavelength in the visible light region is superimposed on a macro concave-convex structure whose average concave-convex period is larger than a wavelength in the visible light region. On the other hand, the optical bodies according to Comparative Examples 1 to 4, which do not have such a superimposition structure, cannot have both antireflection capability and antiglare capability.

(Evaluation Results of Glossiness of Optical Body)

Next, evaluation results of glossiness of the optical body according to the present embodiment will be described. Specifically, for the optical bodies according to Examples 1 to 4 and Comparative Examples 1 to 4, glossiness was measured. Here, glossiness is an index indicating the gloss of an optical body, and a higher value indicates that the optical body has a higher light scattering property, becoming more matte, and has higher antiglare capability.

In measuring the glossiness, a haze meter HM-150 produced by MURAKAMI COLOR RESEARCH LABORATORY CO., Ltd. was used. 20-degree glossiness indicates reflectance at a light receiving angle of 20° when light is projected on the surface of the optical body at an incident angle of 20°. 60-degree glossiness indicates reflectance at a light receiving angle of 60° when light is projected on the surface of the optical body at an incident angle of 60°. 80-degree glossiness indicates reflectance at a light receiving angle of 80° when light is projected on the surface of the optical body at an incident angle of 80°. Measurement results are shown in Table 3 below.

TABLE 3

|  | 20 deg glossiness [%] | 60 deg glossiness [%] | 80 deg glossiness [%] |
|---|---|---|---|
| Example 1 | 0.1 | 0.4 | 16.6 |
| Example 2 | 0.3 | 2.5 | 17.3 |
| Example 3 | 0.2 | 3.7 | 61.2 |
| Example 4 | 0.3 | 3 | 61.3 |
| Comparative Example 1 | 1 | 18.6 | 59.5 |
| Comparative Example 2 | 13.4 | 44.6 | 90.7 |
| Comparative Example 3 | 4 | 12.3 | 73.1 |
| Comparative Example 4 | 4.8 | 26.2 | 65.9 |

According to Table 3, the optical bodies according to Examples 1 to 4 exhibit lower glossiness than the optical bodies according to Comparative Examples 1 to 4, indicating higher light scattering property and higher antiglare capability. Specifically, the 20-degree glossinesses of the optical bodies according to Examples 1 to 4 are 4% or less, more specifically less than 1%. The 60-degree glossinesses of the optical bodies according to Examples 1 to 4 are 10% or less.

On the other hand, the 20-degree glossinesses of the optical bodies according to Comparative Examples 1 to 4 are 1% or more, and the 60-degree glossinesses thereof are more than 10%, which indicates that the optical bodies according to Comparative Examples 1 to 4 have low light scattering property and have low antiglare capability.

(3.3. Experimental Evaluation of Optical Body)

Next, with reference to FIGS. 16 and 17, description will be given on evaluation results when the optical body according to the present embodiment is used as an antireflection film. Specifically, it was evaluated whether, when attached on a liquid crystal display, the optical body according to the present embodiment can prevent external light reflection and improve the viewability of the liquid crystal display.

Example 5

The optical body according to Example 2 of the present invention was attached to a liquid crystal display of iPodTouch (registered trademark) via an adhesive layer with a refractive index of 1.5; thus, Example 5 was prepared.

Comparative Examples 5 to 8

As in Example 5, the optical bodies according to Comparative Examples 1 to 4 were each attached to a liquid crystal display of iPodTouch via an adhesive layer with a refractive index of 1.5; thus, Comparative Examples 5 to 8 were prepared.

Comparative Example 9

A liquid crystal display of iPodTouch having nothing attached was prepared as Comparative Example 9.

The liquid crystal displays according to Example 5 and Comparative Examples 5 to 9 were irradiated from the front with light of a 27W 3-wavelength day white fluorescent lamp, and regular reflected light was measured with a luminance meter in each of a white display portion and a black display portion. The luminance of the white display portion in external light irradiation was divided by the luminance of the black display portion; thus, the contrast ratio of the liquid crystal display was calculated. Furthermore, for the liquid crystal displays according to Example 5 and Comparative Examples 5 to 9, the luminance of the white display portion in a state without external light irradiation (a dark place) was measured. In measuring the luminance, a luminance meter CS1000 produced by Konica Minolta, Inc. was used.

Table 4 below shows the evaluation results of the contrast ratio in external light irradiation and the evaluation results of the luminance of the white display portion in a dark place for the liquid crystal displays according to Example 5 and Comparative Examples 5 to 9, which were obtained in the above-described measurements.

TABLE 4

|  | Antireflection film | Contrast ratio in external light irradiation | Luminance at dark place [cd/m$^2$] |
|---|---|---|---|
| Example 5 | Example 2 | 5.1 | 559.4 |
| Comparative Example 5 | Comparative Example 1 | 3.5 | 586.0 |
| Comparative Example 6 | Comparative Example 2 | 2.1 | 601.8 |
| Comparative Example 7 | Comparative Example 3 | 3.0 | 561.0 |
| Comparative Example 8 | Comparative Example 4 | 1.8 | 566.3 |
| Comparative Example 9 | None | 1.5 | 557.6 |

According to Table 4, the liquid crystal display according to Example 5 exhibits higher contrast ratio of the white display portion to the black display portion in external light irradiation than the liquid crystal displays according to Comparative Examples 5 to 9. That is, the liquid crystal display according to Example 5 can prevent external light reflection more than the liquid crystal displays according to Comparative Examples 5 to 9, and thus can suppress a reduction in contrast ratio due to external light reflection.

In addition, according to Table 4, the liquid crystal display according to Example 5 exhibits a luminance at a dark place similar to those of the liquid crystal displays according to Comparative Examples 5 to 9. Accordingly, while having high antireflection capability, the liquid crystal display according to Example 5 transmits light from the liquid crystal display without attenuation.

The above results demonstrate that the optical body according to the present embodiment can be suitably used as an antireflection film and improves the viewability of a liquid crystal display in an environment with strong external light irradiation.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 optical body
11 base material 12 flat plane
13 macro concave-convex structure
13A valley part
13B slope part
13C peak part
14 micro concave-convex structure
141 projecting part
141A valley-side projecting part
141B intermediate projecting part
141C peak-side projecting part
143 bottom part

The invention claimed is:

1. An optical body comprising:
a first concave-convex structure formed on a surface of a base material; and
a second concave-convex structure superimposed on the first concave-convex structure, wherein
an average concave-convex cycle of the first concave-convex structure is larger than a wavelength in a visible light region,
an average concave-convex cycle of the second concave-convex structure is less than or equal to the wavelength in the visible light region,
projecting parts of the second concave-convex structure extend in a direction normal to a flat plane of the base material, and
wherein a 20-degree glossiness of the optical body is 4% or less.

2. The optical body according to claim 1, wherein
the projecting parts of the second concave-convex structure include
a peak-side projecting part in a peak part of the first concave-convex structure,
a valley-side projecting part in a valley part of the first concave-convex structure, and
an intermediate projecting part in a slope part between the peak part and the valley part of the first concave-convex structure, and
a height of the intermediate projecting part is different from heights of the peak-side projecting part and the valley-side projecting part.

3. The optical body according to claim 1, wherein a spectral regular luminous reflectance of the optical body is 0.3% or less, and a haze value of the optical body is 5% or more.

4. The optical body according to claim 1, wherein the projecting parts of the second concave-convex structure are arranged periodically.

5. The optical body according to claim 4, wherein the projecting parts of the second concave-convex structure are arranged in a hexagonal lattice form or a rectangular lattice form.

6. The optical body according to claim 1, wherein the base material is a resin film.

7. A display device comprising the optical body according to claim 1.

8. The optical body according to claim 1, wherein the base material comprises quartz glass, soda-lime glass, or lead glass.

9. The optical body according to claim 1, wherein the base material has a transmittance of light having a wavelength in a visible light region of 70% or more.

* * * * *